(12) United States Patent
Kjaer et al.

(10) Patent No.: US 12,440,454 B2
(45) Date of Patent: Oct. 14, 2025

(54) PHARMACEUTICAL COMPOSITIONS CONTAINING HEMP EXTRACT FOR ADMINISTRATION TO FELINES AND RELATED METHODS

(71) Applicant: Portland Technology Holdings LLC, South Portland, ME (US)

(72) Inventors: Christian Kjaer, South Portland, ME (US); German Graff, South Portland, ME (US)

(73) Assignee: Portland Technology Holdings LLC, South Portland, ME (US)

( * ) Notice: Subject to any disclaimer, the term of this patent is extended or adjusted under 35 U.S.C. 154(b) by 0 days.

(21) Appl. No.: 18/162,990

(22) Filed: Feb. 1, 2023

(65) Prior Publication Data

US 2023/0285318 A1   Sep. 14, 2023

Related U.S. Application Data

(60) Provisional application No. 63/267,417, filed on Feb. 1, 2022.

(51) Int. Cl.
*A61K 31/05* (2006.01)
*A61K 9/00* (2006.01)
*A61K 31/192* (2006.01)
*A61K 31/352* (2006.01)

(52) U.S. Cl.
CPC ............ *A61K 31/05* (2013.01); *A61K 9/0056* (2013.01); *A61K 31/192* (2013.01); *A61K 31/352* (2013.01)

(58) Field of Classification Search
CPC ..... A61K 31/05; A61K 31/192; A61K 31/352
See application file for complete search history.

(56) References Cited

U.S. PATENT DOCUMENTS

| | | |
|---|---|---|
| 6,242,456 B1 | 6/2001 | Shuster et al. |
| 8,895,078 B2 | 11/2014 | Mueller |
| 9,955,716 B1 | 5/2018 | Nordahl |
| 10,272,051 B2 | 4/2019 | Changoer et al. |
| 10,517,848 B2 | 12/2019 | Segreti |
| 10,597,348 B1 | 3/2020 | Nordahl |
| 10,918,686 B2 | 2/2021 | Siurkus |
| 10,940,173 B2 | 3/2021 | Finley et al. |
| 11,712,456 B2 * | 8/2023 | Howland ............ A61K 31/353 514/456 |
| 11,752,127 B2 | 9/2023 | Kulpa et al. |
| 2005/0165088 A1 | 7/2005 | Whittle et al. |
| 2005/0266108 A1 | 12/2005 | Flockhart et al. |
| 2010/0168448 A1 | 7/2010 | Flockhart et al. |
| 2010/0249223 A1 | 9/2010 | Di Marzo et al. |
| 2010/0286098 A1 | 11/2010 | Robson et al. |
| 2010/0292345 A1 | 11/2010 | Pertwee |
| 2013/0059018 A1 | 3/2013 | Parolaro et al. |
| 2013/0209483 A1 | 8/2013 | McAllister |
| 2014/0039043 A1 | 2/2014 | Musty et al. |
| 2014/0221469 A1 | 8/2014 | Ross et al. |
| 2014/0256692 A1 | 9/2014 | Brockman |
| 2015/0057342 A1 | 2/2015 | Koren et al. |
| 2015/0265637 A1 | 9/2015 | Kane et al. |
| 2016/0000084 A1 | 1/2016 | Bickers et al. |
| 2016/0000843 A1 | 1/2016 | Lowe et al. |
| 2016/0053220 A1 | 2/2016 | Peet et al. |
| 2016/0106705 A1 | 4/2016 | Verzura et al. |
| 2016/0228385 A1 | 8/2016 | Sievers et al. |
| 2016/0271088 A1 | 9/2016 | Bannister et al. |
| 2016/0296464 A1 | 10/2016 | Lindsay |
| 2016/0346339 A1 | 12/2016 | Finley et al. |
| 2017/0143642 A1 | 5/2017 | Stott et al. |
| 2017/0172977 A1 | 6/2017 | Kleidon et al. |
| 2017/0290870 A1 | 10/2017 | Schaneville |
| 2017/0348306 A1 | 12/2017 | Creasy et al. |
| 2018/0104214 A1 | 4/2018 | Raichman |
| 2018/0116998 A1 | 5/2018 | Sinai et al. |
| 2018/0228751 A1 | 8/2018 | Stott et al. |
| 2018/0258439 A1 | 9/2018 | Boudko et al. |
| 2018/0263952 A1 | 9/2018 | Biro et al. |
| 2018/0338930 A1 | 11/2018 | Small-Howard et al. |
| 2018/0353461 A1 | 12/2018 | Simon et al. |
| 2019/0046440 A1 | 2/2019 | Kleidon et al. |
| 2019/0046499 A1 | 2/2019 | Segreti |
| 2019/0077782 A1 | 3/2019 | Raber et al. |
| 2019/0091144 A1 | 3/2019 | McGarrah et al. |
| 2019/0117619 A1 | 4/2019 | Guy et al. |
| 2019/0133966 A1 | 5/2019 | Koren |
| 2019/0167749 A1 | 6/2019 | Siurkus |
| 2019/0201372 A1 | 7/2019 | Mckay |

(Continued)

FOREIGN PATENT DOCUMENTS

| | | |
|---|---|---|
| CA | 2993023 A1 | 1/2017 |
| CN | 1840051 A | 10/2006 |

(Continued)

OTHER PUBLICATIONS

Earth Buddy Pet, "Balance Hemp Extract 500mg 30mL", first available 2021 (Year: 2021).*
ElleVet Sciences, "ElleVet Hemp CBD+CBDA Feline Complete Paste", first available Jan. 10, 2022 (Year: 2022).*
Mossabir, "Mechanisms behind the development of chronic low back pain and its neurodegenerative features", 2022, MDPI, 13, pp. 1-15 (Year: 2022).*
Neogi, "The epidemiology and impact of pain in osteoarthritis", 2013, Osteoarthritis Cartilage, 21, pp. 1145-1153 (Year: 2013).*
Price et al. "From mechanism to cure: Renewing the goal to eliminate the disease of pain", 2018, Pain Medicine, 19, pp. 1525-1549 (Year: 2018).*

(Continued)

*Primary Examiner* — Jeffrey H Murray
*Assistant Examiner* — Madeline E Braun
(74) *Attorney, Agent, or Firm* — Dechert LLP

(57) ABSTRACT

Provided herein are pharmaceutical compositions and dosage forms comprising hemp extract that are formulated for oral administration to a feline. Also provided are therapeutic methods using the pharmaceutical compositions and dosage forms.

18 Claims, 3 Drawing Sheets

(56) References Cited

U.S. PATENT DOCUMENTS

| | | |
|---|---|---|
| 2019/0290713 A1 | 9/2019 | Freeman |
| 2019/0297821 A1 | 10/2019 | Crawford et al. |
| 2019/0298683 A1 | 10/2019 | Friedman |
| 2020/0009077 A1 | 1/2020 | Kennedy |
| 2020/0009109 A1 | 1/2020 | Macaluso et al. |
| 2020/0015440 A1 | 1/2020 | Crawford et al. |
| 2020/0015441 A1 | 1/2020 | Crawford et al. |
| 2020/0038305 A1 | 2/2020 | Garrison et al. |
| 2020/0039908 A1 | 2/2020 | ElSohly et al. |
| 2020/0093785 A1 | 3/2020 | Stauff |
| 2020/0123125 A1 | 4/2020 | Mayo et al. |
| 2020/0138772 A1 | 5/2020 | Berl et al. |
| 2020/0163900 A1 | 5/2020 | Hossain et al. |
| 2020/0253919 A1 | 8/2020 | Raz et al. |
| 2020/0262806 A1 | 8/2020 | Webb et al. |
| 2020/0270623 A1 | 8/2020 | Pauli et al. |
| 2020/0282062 A1 | 9/2020 | Naheed |
| 2020/0288659 A1 | 9/2020 | Crawford et al. |
| 2020/0306219 A1 | 10/2020 | Kulpa et al. |
| 2020/0405685 A1 | 12/2020 | Lewis et al. |
| 2021/0000079 A1 | 1/2021 | Pinder |
| 2021/0000791 A1 | 1/2021 | Levy |
| 2021/0002331 A1 | 1/2021 | Jakobsen et al. |
| 2021/0022032 A1 | 1/2021 | Kim et al. |
| 2021/0023316 A1 | 1/2021 | Schorr et al. |
| 2021/0093690 A1 | 4/2021 | LaRosa et al. |
| 2021/0137877 A1 | 5/2021 | Hewett |
| 2021/0205236 A1 | 7/2021 | Garabagi et al. |
| 2021/0220323 A1 | 7/2021 | Levy et al. |
| 2023/0110830 A1 | 4/2023 | Howland et al. |
| 2024/0269212 A1 | 8/2024 | Wakshlag et al. |

FOREIGN PATENT DOCUMENTS

| | | | |
|---|---|---|---|
| CN | 106074465 A | 11/2016 | |
| EP | 2044935 A1 | 4/2009 | |
| EP | 2995302 A1 | 3/2016 | |
| EP | 2146731 B1 | 1/2019 | |
| EP | 3449914 A1 | 3/2019 | |
| EP | 3449916 A1 | 3/2019 | |
| EP | 3010498 B1 | 3/2020 | |
| EP | 3258942 B1 | 1/2021 | |
| EP | 3160455 B1 | 5/2021 | |
| WO | 2005072719 A1 | 8/2005 | |
| WO | 2012144892 A1 | 10/2012 | |
| WO | 2015068052 A2 | 5/2015 | |
| WO | 2016094810 A2 | 6/2016 | |
| WO | 2016141056 A1 | 9/2016 | |
| WO | 2017025712 A1 | 2/2017 | |
| WO | 2017072773 A1 | 5/2017 | |
| WO | 2017091764 A1 | 6/2017 | |
| WO | 2017177261 A1 | 10/2017 | |
| WO | 2017178937 A1 | 10/2017 | |
| WO | 2018023166 A1 | 2/2018 | |
| WO | 2018061007 A1 | 4/2018 | |
| WO | 2018102029 A1 | 6/2018 | |
| WO | 2018130682 A1 | 7/2018 | |
| WO | 2018144637 A1 | 8/2018 | |
| WO | WO-2018175259 A1 * | 9/2018 | ............. A23K 10/00 |
| WO | 2018217803 A2 | 11/2018 | |
| WO | 2019021191 A1 | 1/2019 | |
| WO | 2019043259 A1 | 3/2019 | |
| WO | 2019071302 A1 | 4/2019 | |
| WO | 2019104442 A1 | 6/2019 | |
| WO | 2019144190 A1 | 8/2019 | |
| WO | 2019159176 A1 | 8/2019 | |
| WO | 2019195752 A1 | 10/2019 | |
| WO | WO-2019199861 A2 * | 10/2019 | ............. A23K 50/40 |
| WO | 2019210401 A1 | 11/2019 | |
| WO | 2019227167 A1 | 12/2019 | |
| WO | 2020014200 A1 | 1/2020 | |
| WO | 2020016875 A1 | 1/2020 | |
| WO | 2020044118 A1 | 3/2020 | |
| WO | 2020051284 A1 | 3/2020 | |
| WO | 2020084427 A1 | 4/2020 | |
| WO | 2020121312 A1 | 6/2020 | |
| WO | 2020123383 A1 | 6/2020 | |
| WO | 2020171713 A1 | 8/2020 | |
| WO | 2020257875 A1 | 12/2020 | |
| WO | WO-2021003341 A1 * | 1/2021 | ............. A61K 31/015 |
| WO | WO-2021092428 A1 * | 5/2021 | ............. A61K 31/01 |
| WO | 2021173718 A1 | 9/2021 | |
| WO | 2021188983 A1 | 9/2021 | |
| WO | 2021245671 A1 | 12/2021 | |

OTHER PUBLICATIONS

Endoca CBD, "RAW Hemp Oil Paste Extract—2000mg CBD+CBDa", available 2019 (Year: 2019).*

Kogan et al., "Consumers' Perceptions of Hemp Products for Animals", 2016, AHVMA Journal, 42, pp. 40-48 (Year: 2020).*

MedlinePlus, "Diarrhea", 2016, National Institutes of Health/National Library of Medicine, pp. 1-8 (Year: 2016).*

Extract Labs, "Immune Support CBGA CBDA Tincture", first available Jan. 23, 2022 (Year: 2022).*

Barcelos et al., "Common Risk Factors for Urinary House Soiling (Periuria) in Cats and Its Differentiation: The Sensitivity and Specificity of Common Diagnostic Signs," Front Vet Sci. 2018;5:108.

Bouquiéet. al., "Cannabis and anticancer drugs: societal usage and expected pharmacological interactions—a review," Fund Clin Pharm. 2018;32(5):462-484.

Broccardo et. al. "Multiplexed analysis of steroid hormones in human serum using novel microflow tile technology and LC-MS/MS," J Chromatogr B Analyt Technol Biomed Life Sci. 2013;934:16-21.

"Cannabinoid," retrieved Oct. 25, 2018 from https://en.wikipedia.org/w/index.php?title=Cannabinoid&oldid=865633208.

Citti et al., "Analysis of cannabinoids in commercial hemp seed oil and decarboxylation kinetics studies of cannabidiolic acid (CBDA)," J Pharm Biomed Anal. 2018;5(149):532-540.

Giuffrida et. al., "Development and psychometric testing of the Canine Owner-Reported Quality of Life questionnaire, an instrument designed to measure quality of life in dogs with cancer," J Am Vet Med Assoc. 2018;252(9):1073-83.

Ibrahim et al., "Determination of Acid and Neutral Cannabinoids in Extracts of Different Strains of *Cannabis sativa* Using GC-FID," Planta Med. 2018;84(4):250-259.

Iliopoulou et. al., "Development of a survey instrument to assess health-related quality of life in small animal cancer patients treated with chemotherapy," J Am Vet Med Assoc. 2013;242(12):1679-87.

Kitryte et al., "Biorefining of industrial hemp (*Cannabis sativa* L.) threshing residues into cannabinoid and antioxidant fractions by supercritical carbon dioxide, pressurized liquid and enzyme-assisted extractions," Food Chemistry. 2018;267(420-429).

MacLean et al., "Skyline: an open source document editor for creating and analyzing targeted proteomics experiments," Bioinformatics. 2010; 26(7):966-8.

Manallack et. al. "The Significance of Acid/Base Properties in Drug Discovery," Chem. Soc Rev. 2013;42(2):485-496.

Mason et. al., "Gastrointestinal toxicity after vincristine or cyclophosphamide administered with or without maropitant in dogs: a prospective randomised controlled study," J Small Anim Pract. 2014;55(8):391-8.

Nadel et. al., "Tetrahydrocannabinolic acid is a potent PPARg agonist with neuroprotective activity," Br. J. Pharmacol. 2017;174(23):4263-4276.

"Nerolidol 2," 2018, retrieved Nov. 2, 2020 from https://web.archive.org/web/20181019021317/htps:/www.restek.com/compound/view/142-50-7/Nerolidol2.

PCT International Search Report from PCT/US2019/026631 dated Aug. 2, 2019.

PCT International Search Report from PCT/US2020/040614 dated Nov. 23, 2020.

PCT International Search Report from PCT/US2020/059467 dated Apr. 5, 2021.

Perola, "An Analysis of the Binding Efficiencies of Drugs and Their Leads in Successful Drug Discovery Programs," J. Med. Chem. 2010;53(7):2986-2997.

(56) References Cited

OTHER PUBLICATIONS

Ramos et al., "A closer look at the health of cats showing urinary house-soiling (periuria): a case-control study," J. Feline Med Surg. 2018;21(8)772-779.

Rock and Parker, "Effect of low doses of cannabidiolic acid and ondansetron on LiCl-induced conditioned gaping (a model of nausea-induced behaviour) in rats," Br. J. Pharmacol. 2013;169(3): 685-692.

Schrivastava, "Methods for the detemination of limit of detection and limit of quanitation of the analytical methods," Chron Young Sci. 2011;2:21-5.

Sulak et. al., "The current status of artisanal cannabis for the treatment of epilepsy in the United States," Epilepsy Behav. 2017;70(Pt B):328-333.

Tomiyasu et. al., "Gastrointestinal and hematologic adverse events after administration of vincristine, cyclophosphamide, and doxorubicin in dogs with lymphoma that underwent a combination multidrug chemotherapy protocol," J Vet Med Sci. 2010;72(11):1391-7.

Whittenburg et al., "Development of a limited-sampling model for predication of doxorubicin exposure iin dogs," Vet Comp Oncol. 2014;12(2):114-119.

Wu, et al., "Receptor-mediated in vitro gene transformation by a soluble DNA carrier system," J. Biol. Chem. 1987; 262(10):4429-4432.

Goerl et. al., "Cannabidiolic acid exhibits entourage-like improvements of anticonvulsant activity in an acute rat model of seizures," Epilepsy Res. 2021;169:106525.

Biles, "CBDA—The Raw Story," Project CBD. Published Aug. 11, 2020; Accessed May 31, 2023: https://projectcbd.org/health/cbda/.

U.S. Appl. No. 63/267,417 filed Feb. 21, 2022, Christian Kjaer.

"3 Best Ways Cannabis Can Help with Pet Injuries", Warren London Dog Services, Accessed at: https://www.warrenlondon.com/blogs/warren-london-blog/3-best-ways-cannabis-can-help-with-pet-injuries, Aug. 10, 2020, 7 pages.

"Cannabis compound could be powerful new antibiotic", Institute for Molecular Science, Jun. 24, 2019, pp. 1-4.

"CBD Substantially Improves Atopic Dermatitis Symptoms in Dogs", PRNewswire, Jul. 21, 2020, 11 pages.

Abels et al., "Can we teach old drugs new tricks?—Repurposing of neuropharmacological drugs for inflammatory skin diseases", Experimental Dermatology, 2019, 28(9): 1002-1009.

Blebea et al., "Very Fast RP-UHPLC-PDA Method for Identification and Quantification of the Cannabinoids from Hemp Oil", Appl. Sci., 2021, 11(20):9414, pp. 1-13.

Campora et al., "Cannabinoid receptor type 1 and 2 expression in the skin of healthy dogs and dogs with atopic dermatitis", Am J Vet Res., Jul. 2012, 73(7):988-995.

Draganoiu et al., "Carbopol Polymers for Oral Drug Delivery System", Arh. Farm, 2016(66):37-38.

Gamble et al., "Pharmacokinetics, Safety, and Clinical Efficacy of Cannabidiol Treatment in Osteoarthritic Dogs", Front Vet Sci., Jul. 2018, 5(Article ID 165), pp. 1-9.

Garcia et al., "Safety and efficacy of cannabidiol-cannabidiolic acid rich hemp extract in the treatment of refractory epileptic seizures in dogs", Front Vet Sci., 2022, 9:939966, pp. 1-12.

Gellman, Karen, "What you need to know about CBD for horses", Equine Wellness Magazine, Dec. 6, 2019, 6 pages.

Hazzah et al., "Cannabis in Veternary Medicine: A Critical Review", AHVMA Journal, 2020, 61:17-41.

Sommano et al., "The Cannabis Terpenes", Molecules, Dec. 2020, 25(24):5792, pp. 1-18.

International Preliminary Report on Patentability received for PCT Patent Application No. PCT/US2019/026631, mailed on Oct. 22, 2020, 10 pages.

International Preliminary Report on Patentability received for PCT Patent Application No. PCT/US2020/040614, mailed on Jan. 13, 2023, 13 pages.

International Preliminary Report on Patentability received for PCT Patent Application No. PCT/US2020/059467, mailed on May 19, 2022, 10 pages.

International Preliminary Report on Patentability received for PCT Patent Application No. PCT/US2022/046583, mailed on Apr. 25, 2024, 9 pages.

International Preliminary Report on Patentability received for PCT Patent Application No. PCT/US2022/070630, mailed on Aug. 24, 2023, 11 pages.

International Search Report and Written Opinion received for PCT Patent Application No. PCT/US2022/046583, mailed on Feb. 28, 2023, 12 pages.

International Search Report and Written Opinion received for PCT Patent Application No. PCT/US2022/070630, mailed on Apr. 27, 2022, 14 pages.

International Search Report and Written Opinion received for PCT Patent Application No. PCT/US2023/064095, mailed on Jul. 21, 2023, 12 pages.

* cited by examiner

PHARMACEUTICAL COMPOSITIONS CONTAINING HEMP EXTRACT FOR ADMINISTRATION TO FELINES AND RELATED METHODS

CROSS-REFERENCE TO RELATED APPLICATIONS

This application claims the benefit under 35 U.S.C. § 119 (e) of U.S. Provisional Patent Application No. 63/267,417 filed Feb. 1, 2022, which is herein incorporated by reference in its entirety.

BACKGROUND

Hemp products continue to be popular for use by humans as nutraceuticals. Additionally, many pet owners have an interest in providing such products to their pets. Industrial hemp products that are low in THC (0.3% or less) and higher in other cannabinoids are reported to have health benefits, including analgesic, anti-inflammatory, anti-anxiolytic, and anti-epileptic; and are legal according to the industrial hemp act. Numerous on-line companies sell hemp products, including CBD, CBG, and other oils claiming they are safe and effective for various medical conditions in both pets and people. In the absence of an optimal treatment for pets that can treat or prevent pain, epilepsy, cancer, or other ailments, potentially efficacious pharmacological agents, including cannabinoids, are often sought.

SUMMARY

In one aspect, the present disclosure provides a pharmaceutical composition comprising hemp extract. The hemp extract comprises cannabidiol and cannabidiolic acid. The ratio of cannabidiol to cannabidiolic acid is from about 0.6:1 to about 1:0.6. The pharmaceutical composition is formulated for oral administration to a feline.

In another aspect, the present disclosure provides a pharmaceutical composition comprising hemp extract. The hemp extract comprises cannabigerol and cannabigerolic acid. The ratio of cannabigerol to cannabigerolic acid is from about 0.6:1 to about 1:0.6. The pharmaceutical composition is formulated for oral administration to a feline.

In some embodiments, the hemp extract comprises cannabigerolic acid, cannabigerol, cannabidiol, cannabidiolic acid, Δ9-tetrahydrocannabinol, and cannabichromene.

In another aspect, the present disclosure provides an orally deliverable chew, comprising a pharmaceutical composition as disclosed herein. In some embodiments, the chew comprises at least one pea product. In some embodiments, the at least one pea product comprises pea protein, pea flour, pea fiber, or a combination thereof. In some embodiments, the chew comprises at least one chicken product. In some embodiments, the at least one chicken product comprises chicken fat, chicken liver, chicken meal, or a combination thereof. In some embodiments, the chew comprises at least one fish product. In some embodiments, the at least one fish product comprises tuna meal, white fish meal, or both tuna meal and white fish meal. In some embodiments, the chew comprises one or more of tapioca flour, potassium chloride, calcium carbonate, a flavoring agent, a yeast product, citric acid, a spice, an antioxidant, or a combination thereof. In some embodiments, the chew comprises chicken meal, pea protein, tapioca flour, pea flour, chicken fat, pea fiber, tuna meal, chicken liver, white fish meal, a flavoring agent, dried brewer's yeast, hemp extract, potassium chloride, calcium carbonate, citric acid, rosemary powder, and an antioxidant blend. In some embodiments, the chew comprises about 20% to about 24% wt/wt chicken meal, about 18% to about 22% wt/wt pea protein, about 18% to about 22% wt/wt tapioca flour, about 7.5% to about 11.5% wt/wt pea flour, about 2.5% to about 6.5% wt/wt chicken fat, about 1.6% to about 5.6% wt/wt pea fiber, about 1.2% to about 5.2% wt/wt tuna meal, about 1.2% to about 5.2% wt/wt chicken liver, about 1.2% to about 5.2% wt/wt white fish meal, about 1.2% to about 5.2% wt/wt of a flavoring agent, about 1% to about 5% wt/wt dried brewer's yeast, about 1% to about 5% wt/wt hemp extract, about 0.1% to about 1.5% wt/wt potassium chloride, about 0.1% to about 1.5% wt/wt calcium carbonate, about 0.05% to about 1.0% wt/wt citric acid, about 0.01% to about 1.0% wt/wt rosemary powder, and about 0.01% to about 1.0% wt/wt an antioxidant blend. In some embodiments, the chew comprises about 22.02% wt/wt chicken meal, about 20% wt/wt pea protein, about 20% wt/wt tapioca flour, about 9.5% wt/wt pea flour, about 4.5% wt/wt chicken fat, about 3.6% wt/wt pea fiber, about 3.2% wt/wt tuna meal, about 3.2% wt/wt chicken liver, about 3.2% wt/wt white fish meal, about 3.2% wt/wt of a flavoring agent, about 3% wt/wt dried brewer's yeast, about 3% wt/wt hemp extract, about 0.59% wt/wt potassium chloride, about 0.49% wt/wt calcium carbonate, about 0.3% wt/wt citric acid, about 0.1% wt/wt rosemary powder, and about 0.1% wt/wt an antioxidant blend. In some embodiments, the flavoring agent is selected from the group consisting of peppermint oil, mango extract, beef, poultry, and seafood. In some embodiments, the mass of the chew is about 0.5-10 g. In some embodiments, the mass of the chew is about 4 g, about 6 g, about 9 g, or about 10 g. In some embodiments, the mass of the chew is about 4 g.

In another aspect, the present disclosure provides an orally deliverable paste, comprising a pharmaceutical composition of the present disclosure. In some embodiments, the paste comprises one or more of soy oil, dextrose, dried chicken liver, silica, inulin, polysorbate 60, potassium sorbate, sorbic acid, saccharin, mixed tocopherols, methylparaben, propylparaben, and combinations thereof. In some embodiments, the paste comprises any two, three, four, five, six, seven, eight, nine, ten, eleven, or more of soy oil, dextrose, dried chicken liver, silica, inulin, polysorbate 60, potassium sorbate, sorbic acid, saccharin, mixed tocopherols, methylparaben, and propylparaben.

In some embodiments, the hemp extract of the pharmaceutical composition, chew, or paste comprises α-pinene, β-myrcene, β-pinene, δ-limonene, linalool, β-caryophyllene, α-humulene, nerolidol, guaiol, caryophyllene oxide, and α-bisabolol. In some embodiments, the pharmaceutical composition, chew, or paste comprises Δ9-tetrahydrocannabinol, and the concentration of Δ9-tetrahydrocannabinol is insufficient to produce a psychotropic effect. In some embodiments, the ratio of Δ9-tetrahydrocannabinol to the other cannabinoids is about 1:25. In some embodiments, the concentration of Δ9-tetrahydrocannabinol is less than about 1 mg/mL. In some embodiments, the concentration of Δ9-tetrahydrocannabinol is less than about 0.5 mg/mL. In some embodiments, the concentration of Δ9-tetrahydrocannabinol is less than about 0.3 mg/mL. In some embodiments, the concentration of Δ9-tetrahydrocannabinol is less than about 0.2 mg/mL. In some embodiments, the concentration of Δ9-tetrahydrocannabinol is less than about 0.1 mg/mL. In some embodiments, the concentration of Δ9-tetrahydrocannabinol is about 0 mg/mL. In some embodiments, the hemp extract comprises about 1-10 mg/mL of cannabidiol, about 1-10 mg/mL of cannabidiolic acid, about 0.1-0.3 mg/mL Δ9-tetrahydrocannabinol, and about 0.1-0.4 mg/mL cannabichromene. In some embodiments, the hemp extract comprises about 5 mg/mL of cannabidiol, about 5 mg/mL of cannabidiolic acid, about 0.25 mg/mL Δ9-tetrahydrocannabinol, and about 0.27 mg/mL cannabichromene. In some embodiments, the hemp extract comprises about 1-10 mg/mL of cannabigerol, about 1-10 mg/mL of cannabigerolic acid, about 0.1-0.3 mg/mL Δ9-tetrahydrocannabinol, and about 0.1-0.4 mg/mL cannabichromene. In some embodiments, the hemp extract comprises about 5 mg/mL of cannabigerol, about 5 mg/mL of cannabigerolic acid, about 0.25 mg/mL Δ9-tetrahydrocannabinol, and about 0.27 mg/mL cannabichromene. In some embodiments, the hemp extract comprises about 0.09-0.13% α-pinene, about 0.23-0.44% β-myrcene, about 0.04-0.09% β-pinene, about 0.05-0.09% δ-limonene, about 0.03-0.06% linalool, about 0.04-0.07% β-caryophyllene, about 0.02-0.04% α-humulene, about 0.04-0.07% nerolidol, about 0.02-0.04% guaiol, about 0.04-0.08% caryophyllene oxide, and about 0.01-0.04% α-bisabolol. In some embodiments, the hemp extract further comprises camphene, β-ocimene, eucalyptol, isopulegol, and/or nerolidol. In some embodiments, the hemp extract comprises about 0.02% camphene, about 0.02-0.03% β-ocimene, about 0.02-0.05% eucalyptol, about 0.02% isopulegol, and/or about 0.02-0.04% nerolidol. In some embodiments, the hemp extract is formulated into a carrier. In some embodiments, the carrier comprises one or more of: linseed oil, olive oil, fish oil, salmon oil, coconut oil, catnip oil, sesame oil, MCT oil, lecithin, carboxypolymethylene, grapeseed oil, and hemp seed oil. In some embodiments, the carrier comprises lecithin. In some embodiments, the lecithin is sunflower lecithin. In some embodiments, the carrier comprises carboxypolymethylene. In some embodiments, the carrier comprises hemp seed oil. In some embodiments, the ratio of cannabidiol to cannabidiolic acid is selected from the group consisting of about 1:100, about 1:50, about 1:10, and about 1:1. In some embodiments, the ratio of cannabidiol to cannabidiolic acid is about 1:1. In some embodiments, the ratio of cannabigerol to cannabigerolic acid is selected from the group consisting of about 1:100, about 1:50, about 1:10, and about 1:1. In some embodiments, the ratio of cannabigerol to cannabigerolic acid is about 1:1. In some embodiments, the feline is a domestic cat. In some embodiments, the paste comprises: 1-10 mg/g of cannabidiol; 1-10 mg/g of cannabidiolic acid; 1 mg/g or less of Δ9-tetrahydrocannabinol; 1 mg/g or less of Δ9-tetrahydrocannabinolic acid; 1 mg/g or less of cannabigerol; and 1 mg/g or less of cannabigerolic acid. In some embodiments, the paste comprises: about 6.5 mg/g of cannabidiol; about 6.5 mg/g of cannabidiolic acid; about 0.25 mg/g of Δ9-tetrahydrocannabinol; about 0.17 mg/g of Δ9-tetrahydrocannabinolic acid; about 0.13 mg/g of cannabigerol; and about 0.13 mg/g of cannabigerolic acid. In another aspect the present disclosure provides a method for treating or preventing pain in a veterinary subject in need thereof. The method comprises administering to the subject a therapeutically effective amount of a composition, chew, or paste of the present disclosure. In some embodiments, the pain is associated with arthritis, post-operative pain, acute pain, joint pain, or multi-joint pain. In some embodiments, the pharmaceutical composition or dosage form is administered at a dosage of about 0.1-8.0 mg/kg of hemp extract. In some embodiments, the pharmaceutical composition or dosage form is administered at twice the therapeutically effective dosage for one week, and then subsequently administered at a therapeutically effective dosage. In some embodiments, the therapeutically effective dosage is about 0.1-0.5 mg/kg of hemp extract. In some embodiments, the therapeutically effective dosage is about 2 mg/kg of hemp extract. In some embodiments, the therapeutically effective dosage is about 8 mg/kg of hemp extract. In some embodiments, the pharmaceutical composition or dosage form is administered at a dosage of about 1 mg/kg of hemp extract for one week, and then subsequently administered at a dosage of about 0.1-0.5 mg/kg of hemp extract. In some embodiments, the pharmaceutical composition or dosage form is administered at a dosage of about 4 mg/kg of hemp extract for one week, and then subsequently administered at a dosage of about 2 mg/kg of hemp extract. In some embodiments, the subject is a feline. In some embodiments, the composition, paste, or chew is administered orally.

DETAILED DESCRIPTION

Figure 1:
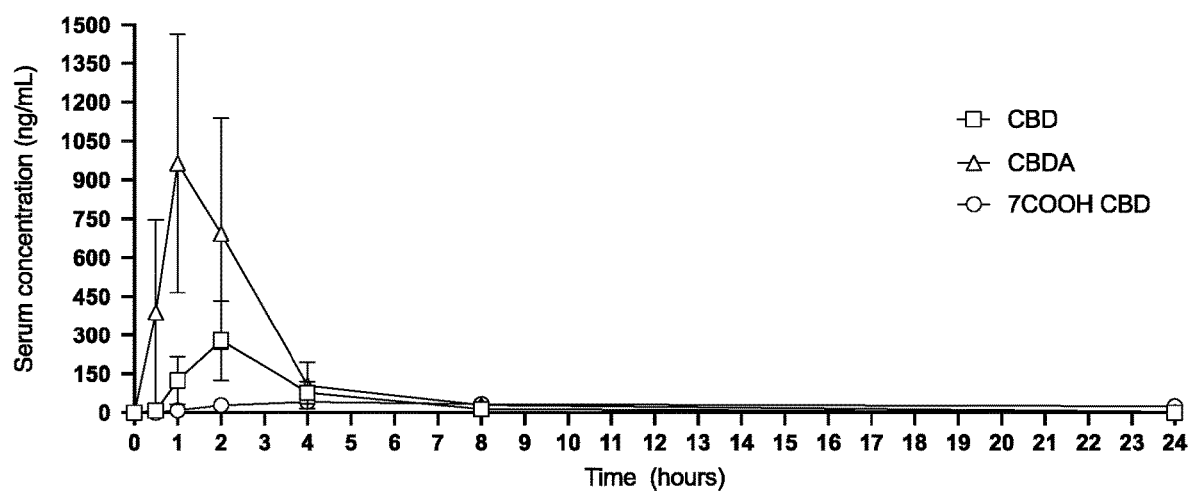
FIG. 1 is a line graph showing serum concentration of CBD, CBDA, and 7COOH CBD in cats.

The present disclosure provides pharmaceutical compositions comprising hemp extract, including one or more cannabinoids such as, for example, cannabidiol, cannabidiolic acid, cannabigerol, cannabigerolic acid, Δ9-tetrahydrocannabinol, and cannabichromene formulated for administration to a feline. The present disclosure reports that formulating a pharmaceutical composition for administration (e.g., oral administration) to a feline can require different ingredients and strategies, compared to those used to formulate compositions for other animals such as dogs.

Definitions

Listed below are definitions of various terms used herein. These definitions apply to the terms as they are used throughout this specification and claims, unless otherwise limited in specific instances, either individually or as part of a larger group.

Unless defined otherwise, all technical and scientific terms used herein generally have the same meaning as commonly understood by one of ordinary skill in the art to which this invention belongs. Generally, the nomenclature used herein and the laboratory procedures in cell culture, molecular genetics, organic chemistry, and peptide chemistry are consistent with those commonly employed in the art.

As used herein, the articles "a" and "an" refer to one or to more than one (i.e., to at least one) of the grammatical object of the article. By way of example, "an element" means one element or more than one element. Furthermore, the use of the term "including" as well as other forms, such as "include," "includes," and "included," is not limiting.

As used herein, the term "about" will be understood by persons of ordinary skill in the art and will vary to some extent on the context in which it is used. As used herein when referring to a measurable value such as an amount, a temporal duration, and the like, the term "about" is meant to encompass variations of ±5%, from the specified value, as such variations are appropriate to perform the disclosed methods.

As used in the specification and in the claims, the term "comprising" may include the embodiments "consisting of" and "consisting essentially of." The terms "comprise(s)," "include(s)," "having," "has," "may," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated compounds, which allows the presence of only the named compounds, along with any pharmaceutically acceptable carriers, and excludes other compounds.

All ranges disclosed herein are inclusive of the recited endpoint and independently combinable (for example, the range of "from 50 mg to 500 mg" is inclusive of the endpoints, 50 mg and 500 mg, and all the intermediate values). The endpoints of the ranges and any values disclosed herein are not limited to the precise range or value; they are sufficiently imprecise to include values approximating these ranges and/or values.

As used herein, the term "treatment" or "treating," is defined as the application or administration of a therapeutic agent, i.e., a compound provided herein (alone or in combination with another pharmaceutical agent), to a patient, or application or administration of a therapeutic agent to an isolated tissue or cell line from a patient (e.g., for diagnosis or ex vivo applications), with the purpose to cure, heal, alleviate, relieve, alter, remedy, ameliorate, improve, or affect the symptoms of a disease, disorder, syndrome, or condition. Such treatments can be specifically tailored or modified, based on knowledge obtained from the field of pharmacogenomics.

As used herein, the term "prevent" or "prevention" means no disorder or disease development if none had occurred, or no further disorder or disease development if there had already been the development of the disorder or disease. Also considered is the ability of one to prevent some or all of the symptoms associated with the disorder or disease.

As used herein, the term "use" includes any one or more of the following embodiments of the invention, respectively: the use in the treatment of pain, the use for the manufacture of pharmaceutical compositions for use in the treatment of these diseases, e.g., in the manufacture of a medicament; methods of use of compounds of the invention in the treatment of these diseases; pharmaceutical preparations having compounds of the invention for the treatment of these diseases; and compounds of the invention for use in the treatment of these diseases; as appropriate and expedient, if not stated otherwise.

As used herein, the term "patient," "individual," or "subject" is intended to include organisms, e.g., prokaryotes and eukaryotes, which are capable of suffering from or afflicted with a disease, disorder, or condition associated with the activity of a protein kinase. Examples of subjects include cats. In certain embodiments, the subject is a feline. In some embodiments, the feline is a domestic cat. In some embodiments, the feline is a big cat. In some embodiments, the feline is a tiger, lion, jaguar, panther, bobcat, lynx, or leopard.

When used with respect to methods of treatment/prevention and the use of the compounds and pharmaceutical compositions thereof described herein, an individual "in need thereof" may be an individual who has been diagnosed with or previously treated for the condition to be treated. With respect to prevention, the individual in need thereof may also be an individual who is at risk for a condition (e.g., a family history of the condition, lifestyle factors indicative of risk for the condition, etc.). Typically, when a step of administering a compound of the invention is disclosed herein, the invention further contemplates a step of identifying an individual or subject in need of the particular treatment to be administered or having the particular condition to be treated.

As used herein, the term "pharmaceutically acceptable" refers to a material, such as a carrier or diluent, which does not abrogate the biological activity or properties of the compound, and is relatively non-toxic, i.e., the material can be administered to an individual without causing undesirable biological effects or interacting in a deleterious manner with any of the components of the composition in which it is contained.

As used herein, the term "pharmaceutically acceptable salt" refers to derivatives of the disclosed compounds, wherein the parent compound is modified by converting an existing acid or base moiety to its salt form. Examples of pharmaceutically acceptable salts include, but are not limited to, mineral or organic acid salts of basic residues such as amines; alkali or organic salts of acidic residues such as carboxylic acids; and the like. The pharmaceutically acceptable salts of the present invention include the conventional non-toxic salts of the parent compound formed, for example, from non-toxic inorganic or organic acids. The pharmaceutically acceptable salts of the present invention can be synthesized from the parent compound which contains a basic or acidic moiety by conventional chemical methods. Generally, such salts can be prepared by reacting the free acid or base forms of these compounds with a stoichiometric amount of the appropriate base or acid in water or in an organic solvent, or in a mixture of the two; generally, nonaqueous media like ether, ethyl acetate, ethanol, isopropanol, or acetonitrile are preferred. Lists of suitable salts are found in Remington's Pharmaceutical Sciences, 17th ed., Mack Publishing Company, Easton, PA, 1985, p. 1418 and Journal of Pharmaceutical Science, 66, 2 (1977), each of which is incorporated herein by reference in its entirety.

As used herein, the term "composition" or "pharmaceutical composition" refers to a mixture of at least one compound useful within the invention with a pharmaceutically acceptable carrier. The pharmaceutical composition facilitates the administration of the compound to a patient or subject. Multiple techniques of administering a compound exist in the art including, but not limited to, intravenous, oral, aerosol, parenteral, ophthalmic, pulmonary, and topical administration.

As used herein, the term "pharmaceutically acceptable carrier" or "carrier" means a pharmaceutically acceptable material, composition, or carrier, such as a liquid or solid filler, stabilizer, dispersing agent, suspending agent, diluent, excipient, thickening agent, solvent, or encapsulating material, involved in carrying or transporting a compound useful within the invention within or to the patient such that it can perform its intended function. Typically, such constructs are carried or transported from one organ, or portion of the body, to another organ, or portion of the body. Each carrier must be "acceptable" in the sense of being compatible with the other ingredients of the formulation, including the compound useful within the invention, and not injurious to the patient. Some examples of materials that can serve as pharmaceutically acceptable carriers include: sugars, such as lactose, glucose, and sucrose; starches, such as corn starch and potato starch; cellulose, and its derivatives, such as sodium carboxymethyl cellulose, ethyl cellulose, and cellulose acetate; powdered tragacanth; malt; gelatin; talc; excipients, such as cocoa butter and suppository waxes; oils, such as peanut oil, cottonseed oil, safflower oil, sesame oil, olive oil, corn oil, and soybean oil;

glycols, such as propylene glycol; polyols, such as glycerin, sorbitol, mannitol, and polyethylene glycol; esters, such as ethyl oleate and ethyl laurate; agar; buffering agents, such as magnesium hydroxide and aluminum hydroxide; surface-active agents; alginic acid; pyrogen-free water; isotonic saline; Ringer's solution; ethyl alcohol; phosphate buffer solutions; and other non-toxic compatible substances employed in pharmaceutical formulations. As used herein, "pharmaceutically acceptable carrier" also includes any and all coatings, antibacterial and antifungal agents, and absorption delaying agents, and the like that are compatible with the activity of the compound useful within the invention and are physiologically acceptable to the patient. Supplementary active compounds can also be incorporated into the compositions. The "pharmaceutically acceptable carrier" or "carrier" can further include a pharmaceutically acceptable salt of the compound useful within the invention. Other additional ingredients that can be included in the pharmaceutical compositions used in the practice of the invention are known in the art and described, for example in Remington's Pharmaceutical Sciences, Mack Publishing Company, Easton, PA), which is incorporated herein by reference.

The term "stabilizer," as used herein, refers to polymers capable of chemically inhibiting or preventing degradation. Stabilizers are added to formulations of compounds to improve the chemical and physical stability of the compound.

As used herein, the terms "effective amount," "pharmaceutically effective amount," and "therapeutically effective amount" refer to a nontoxic but sufficient amount of an agent to provide the desired biological result. That result may be reduction or alleviation of the signs, symptoms, or causes of a disease, or any other desired alteration of a biological system. An appropriate therapeutic amount in any individual case may be determined by one of ordinary skill in the art using routine experimentation.

As used herein, the term "weight percent" or "wt/wt" is meant to refer to the quantity by weight of a constituent component of a composition as a percentage of the weight of the total composition. The weight percent can also be calculated by multiplying the mass fraction by 100. The "mass fraction" is the ratio of one substance of a mass $m_1$ to the mass of the total composition $m_T$ such that weight percent=$(m_1/m_T)*100$.

"Aqueous buffer" refers to a water solution that resists change in the hydronium ion and the hydroxide ion concentration (and consequent pH) upon addition of small amounts of acid or base, or upon dilution. Buffer solutions consist of a weak acid and its conjugate base (more common) or a weak base and its conjugate acid (less common). The buffer can be prepared by methods well known in the art with the appropriate buffering agents to give the desired pH value. Examples of suitable buffering agents include hydrochloric acid, lactic acid, acetic acid, citric acid, malic acid, maleic acid, pyruvic acid, succinic acid, tris-hydroxymethylaminomethane, sodium hydroxide, sodium bicarbonate, phosphoric acid, sodium phosphate, and other biologically acceptable buffering agents. Aqueous buffers are readily available commercially and they can be used in the preparation of the compositions of this invention without further treatment.

As used herein, the term "hemp extract" refers to a composition of cannabinoids and terpenes that are isolated from a hemp plant. "Hemp extract" includes "CBG/CBGA oil", "CBD/CBDA oil", and other oils comprising cannabinoids. The hemp extract can be obtained by any method known in the art. For example, the hemp extract can be obtained by supercritical (or subcritical) $CO_2$ extraction, which uses carbon dioxide under high pressure and low temperatures to isolate, preserve, and maintain the purity of hemp extract. In an embodiment, the hemp extract is obtained from a supercritical $CO_2$ extraction. For example, supercritical $CO_2$ extraction may be performed as described in U.S. Pat. No. 8,895,078, which is incorporated herein by reference in its entirety. Alternatively, a solvent such as petroleum ether, ethanol, methanol, butanol, acetone, dry ice, or olive oil can be used, at room temperature (ambient temperature) with stirring, by passive extraction, heated to a temperature above room temperature, or under reflux, as known in the art to provide the hemp extract. In another embodiment, hemp extract from a butanol extraction is employed as starting material for methods disclosed herein. In some embodiments, the hemp extract undergoes additional steps to concentrate one or more components of the hemp extract. In some embodiments, the hemp extract is enriched for the presence of CBG and/or CBGA. In some embodiments, the hemp extract is enriched for the presence of CBD and/or CBDA.

Suitable methods for measuring the cannabinoid and terpene content in the hemp extract are known in the art. In an embodiment, cannabinoid content is determined using liquid chromatography with mass spectrometry detection (LC-MS). In another embodiment, terpene content is determined using gas chromatography with flame ionization detection (GC-FID) analysis of headspace.

As used herein, the term "flavoring agent" refers to an ingredient that is added to a composition to impart a particular flavor, smell, or other organoleptic property.

As used herein, the term "oil" refers to a nonpolar viscous liquid that is both hydrophobic and lipophilic. Oils may be isolated from animal, vegetable, or petrochemical products.

As used herein, the term "chew" refers to a product or a portion thereof that has rheological and other texture and organoleptic properties which tend to promote chewing upon the article by a target animal. Generally speaking, a chewable matrix will exhibit sufficient ductility that it is at least slightly malleable when bitten by the target animal and sufficient palatability that the target animal is not deterred by its taste from biting it multiple times. By contrast, "chewable" does not mean merely that an article can be chewed by an animal (i.e., it does not mean merely that some portion of the article will fit within an animal's mouth sufficiently to permit engagement of the animal's teeth against the portion).

As used herein, the term "paste" refers to a product or a portion thereof that has rheological and chemical properties which are consistent with containing and delivering pharmaceutical compositions (e.g., a composition comprising a hemp extract) via the mouth. For example, a paste can be applied to the luminal surfaces of the oral cavity (e.g., gums, inner cheeks). Generally speaking, a paste will be sufficiently spreadable that it can be appropriately applied. Additionally, the paste may be flavored and/or exhibit a mouthfeel or texture that promotes consumption by the animal. Thus, in some embodiments, the paste is palatable for the animal to which the paste is applied. In some embodiments, the paste is hydrophobic. In some embodiments, pastes of the present disclosure can be applied to pets by veterinary professionals or by pets' owners.

As used herein, the term "gel" refers to a product or a portion thereof that is an aggregate of fine particles dispersed in a liquid medium, wherein the medium has become viscous enough to behave in some ways like a solid. Additionally, the gel may be flavored and/or exhibit a mouthfeel or texture that promotes consumption by an animal. Thus, in some embodiments, the gel is palatable for the animal to which the gel is applied. In some embodiments, the gel is hydrophilic. In some embodiments, gels of the present disclosure can be applied to pets by veterinary professionals or by pets' owners.

The "maximal serum concentration" of a substance, as used herein, refers to the maximal level of the substance found in a plasma sample following a single administration.

As used herein, the term "cold extrusion" refers to a process for producing edible food products comprising several unit operations, including mixing, kneading, shearing, shaping, and forming, all of which are conducted at or near ambient temperature.

As used herein, the term "psychotropic effect" refers to a modification of brain function that results in an alteration of perception, mood, consciousness, or behavior.

Pharmaceutical Compositions

In an aspect, provided herein is a pharmaceutical composition formulated for administration to a feline comprising hemp extract, wherein the hemp extract comprises:
cannabidiol; and
cannabidiolic acid.

In another aspect, provided herein is a pharmaceutical composition formulated for administration to a feline comprising hemp extract, wherein the hemp extract comprises:
cannabigerol; and
cannabigerolic acid.

In another embodiment, the hemp extract comprises:
cannabigerol;
cannabigerolic acid;
cannabidiol;
cannabidiolic acid;
Δ9-tetrahydrocannabinol; and
cannabichromene.

In some embodiments, the pharmaceutical composition can be formulated into a dosage form that includes ingredients that provide a desirable taste and/or texture for a feline in order to increase acceptance of the pharmaceutical composition by the feline. In some embodiments, the feline is a domestic cat. In some embodiments, the feline is a big cat. In some embodiments, the feline is a tiger, lion, jaguars, panther, bobcat, lynx, or leopard.

In an embodiment, the ratio of cannabidiol to cannabidiolic acid in the hemp extract is selected from the group consisting of about 1:100, about 1:50, about 1:10, and about 1:1. In an embodiment, the ratio of cannabidiol to cannabidiolic acid is about 0.1:1 to about 1:0.1. In another embodiment, the ratio of cannabidiol to cannabidiolic acid is about 0.1:1, about 0.2:1, about 0.3:1, about 0.4:1, about 0.5:1, about 0.6:1, about 0.7:1, about 0.8:1, about 0.9:1, about 1:1, about 1:0.9, about 1:0.8, about 1:0.7, about 1:0.6, about 1:0.5, about 1:0.4, about 1:0.3, about 1:0.2, or about 1:0.1. In yet another embodiment, the ratio of cannabidiol to cannabidiolic acid is about 0.6:1 to about 1:0.6. In still another embodiment, the ratio of cannabidiol to cannabidiolic acid is about 1:1.

In an embodiment, the ratio of cannabigerol to cannabigerolic acid in the hemp extract is about 0.1:1 to about 1:0.1. In another embodiment, the ratio of cannabigerol to cannabigerolic acid is about 0.1:1, about 0.2:1, about 0.3:1, about 0.4:1, about 0.5:1, about 0.6:1, about 0.7:1, about 0.8:1, about 0.9:1, about 1:1, about 1:0.9, about 1:0.8, about 1:0.7, about 1:0.6, about 1:0.5, about 1:0.4, about 1:0.3, about 1:0.2, or about 1:0.1. In yet another embodiment, the ratio of cannabigerol to cannabigerolic acid is about 0.6:1 to about 1:0.6. In still another embodiment, the ratio of cannabigerol to cannabigerolic acid is about 1:1.

In an embodiment, the concentration of Δ9-tetrahydrocannabinol in the hemp extract is insufficient to produce a psychotropic effect. In another embodiment, the ratio of Δ9-tetrahydrocannabinol to the other cannabinoids is from about 1:50 to about 1:20. In yet another embodiment, the ratio of Δ9-tetrahydrocannabinol to the other cannabinoids is about 1:50. In still another embodiment, the ratio of Δ9-tetrahydrocannabinol to the other cannabinoids is about 1:45. In an embodiment, the ratio of Δ9-tetrahydrocannabinol to the other cannabinoids is about 1:40. In another embodiment, the ratio of Δ9-tetrahydrocannabinol to the other cannabinoids is about 1:35. In yet another embodiment, the ratio of Δ9-tetrahydrocannabinol to the other cannabinoids is about 1:30. In still another embodiment, the ratio of Δ9-tetrahydrocannabinol to the other cannabinoids is about 1:25. In an embodiment, the ratio of Δ9-tetrahydrocannabinol to the other cannabinoids is about 1:20.

In an embodiment, the concentration of Δ9-tetrahydrocannabinol is less than about 2 mg/mL. In another embodiment, the concentration of Δ9-tetrahydrocannabinol is less than about 1.5 mg/mL. In yet another embodiment, the concentration of Δ9-tetrahydrocannabinol is less than about 1 mg/mL. In still another embodiment, the concentration of Δ9-tetrahydrocannabinol is less than about 0.9 mg/mL. In yet another embodiment, the concentration of Δ9-tetrahydrocannabinol is less than about 0.8 mg/mL. In an embodiment, the concentration of Δ9-tetrahydrocannabinol is less than about 0.7 mg/mL. In another embodiment, the concentration of Δ9-tetrahydrocannabinol is less than about 0.6 mg/mL. In yet another embodiment, the concentration of Δ9-tetrahydrocannabinol is less than about 0.5 mg/mL. In still another embodiment, the concentration of Δ9-tetrahydrocannabinol is less than about 0.4 mg/mL. In an embodiment, the concentration of Δ9-tetrahydrocannabinol is less than about 0.3 mg/mL. In another embodiment, the concentration of Δ9-tetrahydrocannabinol is less than about 0.2 mg/mL. In yet another embodiment, the concentration of Δ9-tetrahydrocannabinol is less than about 0.1 mg/mL. In another embodiment, the concentration of Δ9-tetrahydrocannabinol is about 0 mg/mL.

In an embodiment, the hemp extract comprises:
about 0.1-20 mg/mL of cannabidiol;
about 0.1-20 mg/mL of cannabidiolic acid;
about 0.01-0.5 mg/mL Δ9-tetrahydrocannabinol; and
about 0.01-0.5 mg/mL cannabichromene.
In another embodiment, the hemp extract comprises:
about 1-10 mg/mL of cannabidiol;
about 1-10 mg/mL of cannabidiolic acid;
about 0.1-0.3 mg/mL Δ9-tetrahydrocannabinol; and
about 0.1-0.4 mg/mL cannabichromene.
In yet another embodiment, the hemp extract comprises:
about 5 mg/mL of cannabidiol;
about 5 mg/mL of cannabidiolic acid;
about 0.25 mg/mL Δ9-tetrahydrocannabinol; and
about 0.27 mg/mL cannabichromene.
In an embodiment, the hemp extract comprises:
about 0.1-20 mg/mL of cannabigerol;
about 0.1-20 mg/mL of cannabigerolic acid;
about 0.01-0.5 mg/mL Δ9-tetrahydrocannabinol; and
about 0.01-0.5 mg/mL cannabichromene.
In another embodiment, the hemp extract comprises:

about 1-10 mg/mL of cannabigerol;
about 1-10 mg/mL of cannabigerolic acid;
about 0.1-0.3 mg/mL Δ9-tetrahydrocannabinol; and
about 0.1-0.4 mg/mL cannabichromene.

In yet another embodiment, the hemp extract comprises:
about 5 mg/mL of cannabigerol;
about 5 mg/mL of cannabigerolic acid;
about 0.25 mg/mL Δ9-tetrahydrocannabinol; and
about 0.27 mg/mL cannabichromene.

In an embodiment, provided herein is a pharmaceutical composition comprising hemp extract, wherein the hemp extract comprises:
α-pinene;
β-myrcene;
β-pinene;
δ-limonene;
linalool;
β-caryophyllene;
α-humulene;
nerolidol;
guaiol;
caryophyllene oxide; and
α-bisabolol.

In another embodiment, the hemp extract comprises:
about 0.09-0.13% α-pinene;
about 0.23-0.44% β-myrcene;
about 0.04-0.09% β-pinene;
about 0.05-0.09% δ-limonene;
about 0.03-0.06% linalool;
about 0.04-0.07% β-caryophyllene;
about 0.02-0.04% α-humulene;
about 0.04-0.07% nerolidol;
about 0.02-0.04% guaiol;
about 0.04-0.08% caryophyllene oxide; and
about 0.01-0.04% α-bisabolol.

In another embodiment, the hemp extract comprises:
about 0.07-0.30% α-pinene;
about 0.10-0.60% β-myrcene;
about 0.02-0.20% β-pinene;
about 0.03-0.20% δ-limonene;
about 0.01-0.08% linalool;
about 0.03-0.09% β-caryophyllene;
about 0.01-0.06% α-humulene;
about 0.02-0.09% nerolidol; and
about 0.01-0.06% guaiol.

In another embodiment, the hemp extract comprises:
about 0.01-0.50% α-pinene;
about 0.01-0.90% β-myrcene;
about 0.01-0.50% β-pinene;
about 0.01-0.50% δ-limonene;
about 0.01-0.50% linalool;
about 0.01-0.50% β-caryophyllene;
about 0.01-0.50% α-humulene;
about 0.01-0.50% nerolidol;
about 0.01-0.50% guaiol;
about 0.01-0.50% caryophyllene oxide; and
about 0.01-0.50% α-bisabolol.

In another embodiment, the hemp extract comprises:
camphene;
β-ocimene;
eucalyptol;
isopulegol; and/or
nerolidol.

In another embodiment, the hemp extract comprises:
about 0.02% camphene;
about 0.02-0.03% β-ocimene;
about 0.02-0.05% eucalyptol;
about 0.02% isopulegol; and/or
about 0.02-0.04% nerolidol.

In another embodiment, the hemp extract comprises:
about 0.01-0.04% camphene;
about 0.01-0.05% β-ocimene;
about 0.01-0.07% eucalyptol;
about 0.01-0.04% isopulegol; and/or
about 0.01-0.05% nerolidol.

In another embodiment, the hemp extract comprises:
about 0.01-0.50% camphene;
about 0.01-0.50% β-ocimene;
about 0.01-0.50% eucalyptol;
about 0.01-0.50% isopulegol; and/or
about 0.01-0.50% nerolidol 1.

In an embodiment, the hemp extract does not comprise terpenes.

In an embodiment, the hemp extract comprises 1 or more of the following: α-pinene, β-myrcene, β-pinene, δ-limonene, linalool, β-caryophyllene, α-humulene, nerolidol, guaiol, caryophyllene oxide, α-bisabolol, camphene, β-ocimene, eucalyptol, isopulegol, and nerolidol.

In an embodiment, the hemp extract comprises 2 or more of the following: α-pinene, β-myrcene, β-pinene, δ-limonene, linalool, β-caryophyllene, α-humulene, nerolidol, guaiol, caryophyllene oxide, α-bisabolol, camphene, β-ocimene, eucalyptol, isopulegol, and nerolidol.

In an embodiment, the hemp extract comprises 3 or more of the following: α-pinene, β-myrcene, β-pinene, δ-limonene, linalool, β-caryophyllene, α-humulene, nerolidol, guaiol, caryophyllene oxide, α-bisabolol, camphene, β-ocimene, eucalyptol, isopulegol, and nerolidol.

In an embodiment, the hemp extract comprises 4 or more of the following: α-pinene, β-myrcene, β-pinene, δ-limonene, linalool, β-caryophyllene, α-humulene, nerolidol, guaiol, caryophyllene oxide, α-bisabolol, camphene, β-ocimene, eucalyptol, isopulegol, and nerolidol.

In an embodiment, the hemp extract comprises 5 or more of the following: α-pinene, β-myrcene, β-pinene, δ-limonene, linalool, β-caryophyllene, α-humulene, nerolidol, guaiol, caryophyllene oxide, α-bisabolol, camphene, β-ocimene, eucalyptol, isopulegol, and nerolidol.

In an embodiment, the hemp extract comprises 6 or more of the following: α-pinene, β-myrcene, β-pinene, δ-limonene, linalool, β-caryophyllene, α-humulene, nerolidol, guaiol, caryophyllene oxide, α-bisabolol, camphene, β-ocimene, eucalyptol, isopulegol, and nerolidol.

In an embodiment, the hemp extract comprises 7 or more of the following: α-pinene, β-myrcene, β-pinene, δ-limonene, linalool, β-caryophyllene, α-humulene, nerolidol, guaiol, caryophyllene oxide, α-bisabolol, camphene, β-ocimene, eucalyptol, isopulegol, and nerolidol.

In an embodiment, the hemp extract comprises 8 or more of the following: α-pinene, β-myrcene, β-pinene, δ-limonene, linalool, β-caryophyllene, α-humulene, nerolidol, guaiol, caryophyllene oxide, α-bisabolol, camphene, β-ocimene, eucalyptol, isopulegol, and nerolidol.

In an embodiment, the hemp extract comprises 9 or more of the following: α-pinene, β-myrcene, β-pinene, δ-limonene, linalool, β-caryophyllene, α-humulene, nerolidol, guaiol, caryophyllene oxide, α-bisabolol, camphene, β-ocimene, eucalyptol, isopulegol, and nerolidol.

In an embodiment, the hemp extract comprises 10 or more of the following: α-pinene, β-myrcene, β-pinene, δ-limonene, linalool, β-caryophyllene, α-humulene, nerolidol, guaiol, caryophyllene oxide, α-bisabolol, camphene, β-ocimene, eucalyptol, isopulegol, and nerolidol.

In an embodiment, the hemp extract comprises 11 or more of the following: α-pinene, β-myrcene, β-pinene, δ-limonene, linalool, β-caryophyllene, α-humulene, nerolidol, guaiol, caryophyllene oxide, α-bisabolol, camphene, β-ocimene, eucalyptol, isopulegol, and nerolidol.

In an embodiment, the hemp extract comprises 12 or more of the following: α-pinene, β-myrcene, β-pinene, δ-limonene, linalool, β-caryophyllene, α-humulene, nerolidol, guaiol, caryophyllene oxide, α-bisabolol, camphene, β-ocimene, eucalyptol, isopulegol, and nerolidol.

In an embodiment, the hemp extract comprises 13 or more of the following: α-pinene, β-myrcene, β-pinene, δ-limonene, linalool, β-caryophyllene, α-humulene, nerolidol, guaiol, caryophyllene oxide, α-bisabolol, camphene, β-ocimene, eucalyptol, isopulegol, and nerolidol.

In an embodiment, the hemp extract comprises 14 or more of the following: α-pinene, β-myrcene, β-pinene, δ-limonene, linalool, β-caryophyllene, α-humulene, nerolidol, guaiol, caryophyllene oxide, α-bisabolol, camphene, β-ocimene, eucalyptol, isopulegol, and nerolidol.

In an embodiment, the hemp extract comprises 15 or more of the following: α-pinene, β-myrcene, β-pinene, δ-limonene, linalool, β-caryophyllene, α-humulene, nerolidol, guaiol, caryophyllene oxide, α-bisabolol, camphene, β-ocimene, eucalyptol, isopulegol, and nerolidol.

In an embodiment, the hemp extract comprises the following: α-pinene, β-myrcene, β-pinene, δ-limonene, linalool, β-caryophyllene, α-humulene, nerolidol, guaiol, caryophyllene oxide, α-bisabolol, camphene, β-ocimene, eucalyptol, isopulegol, and nerolidol.

In an embodiment, the composition is formulated with a carrier (e.g., the hemp extract is contained within or solubilized into the carrier). In an embodiment, the composition is formulated with a carrier comprising an oil. In another embodiment, the carrier is selected from the group consisting of linseed oil, olive oil, fish oil, salmon oil, coconut oil, catnip oil, sesame oil, MCT oil, lecithin, carboxypolymethylene (e.g., polyacrylic acid), grapeseed oil, and hemp seed oil. In yet another embodiment, the carrier is grapeseed oil. In yet another embodiment, the carrier is hemp seed oil. In some embodiments, the carboxypolymethylene comprises Carbopol® 971P NF Polymer, which is available from the Lubrizol Corporation, Ohio, USA.

In an embodiment, the dosage form comprises nepetalactone.

In an embodiment, the dosage form comprises taurine.

In an embodiment, the pharmaceutical composition comprises lecithin. In another embodiment, the lecithin is sunflower lecithin. In another embodiment, the lecithin is about 5%, about 10%, about 15%, about 20%, about 25%, about 30%, about 35%, about 40%, about 45%, or 50% w/v of the pharmaceutical composition. In other embodiments, the pharmaceutical composition comprises lecithin mixed with another oil. In some embodiments, the other oil is sesame oil. In some embodiments, the lecithin and other oil are mixed at a ratio of about 1:4, 1:2, 1:1, 2:1, or 4:1. In some embodiments, the pharmaceutical composition comprises hemp extract and a carrier oil. In some embodiments, the carrier oil is substantially all lecithin. In other embodiments, the carrier oil is 100% lecithin.

In an embodiment, the pharmaceutical composition comprises NF-971P. In an embodiment, the NF-971P is about 0.5%, about 1.0%, about 1.5%, about 2.0%, about 2.5%, or about 3.0% weight/volume ratio of the pharmaceutical composition.

The pharmaceutical compositions of the present disclosure may be manufactured by processes well known in the art, e.g., by means of conventional mixing, dissolving, granulating, grinding, pulverizing, dragee-making, levigating, emulsifying, encapsulating, entrapping, or by lyophilizing processes.

The compositions for use in accordance with the present disclosure thus may be formulated in a conventional manner using one or more pharmaceutically acceptable carriers comprising excipients and auxiliaries, which facilitate processing of the active compounds into preparations which can be used pharmaceutically. Proper formulation is dependent upon the route of administration chosen.

Dosage Forms

In some embodiments, the pharmaceutical composition or hemp extract is formulated into a dosage form. The dosage form can be administered to a feline. The pharmaceutical composition comprises a hemp extract as disclosed herein.

In an embodiment, the dosage form is formulated as a chew for oral administration.

In another embodiment, the chew is produced using cold extrusion.

In another embodiment, the mass of the chew is about 0.5-10 g. In yet another embodiment, the mass of the chew is about 4 g, about 6 g, about 9 g, or about 10 g. In still another embodiment, the mass of the chew is about 0.5 g. In an embodiment, the mass of the chew is about 1 g. In another embodiment, the mass of the chew is about 1.5 g. In yet another embodiment, the mass of the chew is about 2 g. In still another embodiment, the mass of the chew is about 3 g. In an embodiment, the mass of the chew is about 4 g. In another embodiment, the mass of the chew is about 5 g. In yet another embodiment, the mass of the chew is about 6 g. In still another embodiment, the mass of the chew is about 7 g. In an embodiment, the mass of the chew is about 8 g. In another embodiment, the mass of the chew is about 9 g. In yet another embodiment, the mass of the chew is about 10 g.

In some embodiments, the chew comprises at least one pea product. The at least one pea product can provide, for example, macronutrient sources and appropriate texture and/or mouthfeel to the chew. The pea product can comprise pea protein, pea flour, pea fiber, or a combination thereof.

In some embodiments, the chew can comprise pea protein.

In some embodiments, the chew can comprise pea flour.

In some embodiments, the chew can comprise pea fiber.

In some embodiments, the chew comprises at least one chicken product. The at least one chicken product can provide, for example, macronutrient sources and appropriate texture and/or mouthfeel to the chew. Additionally, the chicken product may impart a favorable flavor to the chew. The chicken product can comprise chicken fat, chicken liver, chicken meal, or a combination thereof.

In some embodiments, the chew can comprise chicken fat.

In some embodiments, the chew can comprise chicken liver.

In some embodiments, the chew can comprise chicken meal.

In some embodiments, the chew comprises at least one fish product. The at least one fish product can provide, for example, macronutrient sources and appropriate texture and/or mouthfeel to the chew. Additionally, the fish product may impart a favorable flavor to the chew. The fish product can comprise tuna meal, white fish meal, or both tuna meal and white fish meal.

In some embodiments, the chew can comprise tuna meal.

In some embodiments, the chew can comprise white fish meal.

In some embodiments, the chew comprises at least one additional product. The additional product can provide additional form or body to the chew, preservative function, additional flavors, salt, or non-stick/non-clumping qualities. In some embodiments, the additional product can comprise one or more of tapioca flour, potassium chloride, calcium carbonate, a flavoring agent, a yeast product, citric acid, a spice, an antioxidant, or a combination thereof.

In some embodiments, the antioxidant can comprise an antioxidant blend. The antioxidant blend can comprise a NATUROX® product. NATUROX® comprises mixed tocopherols, emulsifiers, and chelators and is available from Kemin Industries, Iowa, USA.

In some embodiments, the spice can comprise rosemary powder.

In some embodiments, the yeast product can comprise dried brewer's yeast.

In some embodiments, the flavoring agent can comprise C'Sens 9P which is available from Diana Pet Food. C'Sens 9P is a flavoring agent comprising vegetable products. In some embodiments, the flavoring agent is selected from the group consisting of peppermint oil, mango extract, beef, poultry, and seafood flavoring agents.

In some embodiments, the chew comprises any one, two, three, four, five, six, seven, eight, nine, ten, eleven, twelve, thirteen, fourteen, fifteen, sixteen, or seventeen of chicken meal, pea protein, tapioca flour, pea flour, chicken fat, pea fiber, tuna meal, chicken liver, white fish meal, a flavoring agent, dried brewer's yeast, hemp extract, potassium chloride, calcium carbonate, citric acid, rosemary powder, and an antioxidant blend.

In some embodiments, the chew comprises one or more of chicken meal, pea protein, tapioca flour, pea flour, chicken fat, pea fiber, tuna meal, chicken liver, white fish meal, a flavoring agent, dried brewer's yeast, hemp extract, potassium chloride, calcium carbonate, citric acid, rosemary powder, and an antioxidant blend.

In some embodiments, the chew comprises two or more of chicken meal, pea protein, tapioca flour, pea flour, chicken fat, pea fiber, tuna meal, chicken liver, white fish meal, a flavoring agent, dried brewer's yeast, hemp extract, potassium chloride, calcium carbonate, citric acid, rosemary powder, and an antioxidant blend.

In some embodiments, the chew comprises three or more of chicken meal, pea protein, tapioca flour, pea flour, chicken fat, pea fiber, tuna meal, chicken liver, white fish meal, a flavoring agent, dried brewer's yeast, hemp extract, potassium chloride, calcium carbonate, citric acid, rosemary powder, and an antioxidant blend.

In some embodiments, the chew comprises four or more of chicken meal, pea protein, tapioca flour, pea flour, chicken fat, pea fiber, tuna meal, chicken liver, white fish meal, a flavoring agent, dried brewer's yeast, hemp extract, potassium chloride, calcium carbonate, citric acid, rosemary powder, and an antioxidant blend.

In some embodiments, the chew comprises five or more of chicken meal, pea protein, tapioca flour, pea flour, chicken fat, pea fiber, tuna meal, chicken liver, white fish meal, a flavoring agent, dried brewer's yeast, hemp extract, potassium chloride, calcium carbonate, citric acid, rosemary powder, and an antioxidant blend.

In some embodiments, the chew comprises six or more of chicken meal, pea protein, tapioca flour, pea flour, chicken fat, pea fiber, tuna meal, chicken liver, white fish meal, a flavoring agent, dried brewer's yeast, hemp extract, potassium chloride, calcium carbonate, citric acid, rosemary powder, and an antioxidant blend.

In some embodiments, the chew comprises seven or more of chicken meal, pea protein, tapioca flour, pea flour, chicken fat, pea fiber, tuna meal, chicken liver, white fish meal, a flavoring agent, dried brewer's yeast, hemp extract, potassium chloride, calcium carbonate, citric acid, rosemary powder, and an antioxidant blend.

In some embodiments, the chew comprises eight or more of chicken meal, pea protein, tapioca flour, pea flour, chicken fat, pea fiber, tuna meal, chicken liver, white fish meal, a flavoring agent, dried brewer's yeast, hemp extract, potassium chloride, calcium carbonate, citric acid, rosemary powder, and an antioxidant blend.

In some embodiments, the chew comprises nine or more of chicken meal, pea protein, tapioca flour, pea flour, chicken fat, pea fiber, tuna meal, chicken liver, white fish meal, a flavoring agent, dried brewer's yeast, hemp extract, potassium chloride, calcium carbonate, citric acid, rosemary powder, and an antioxidant blend.

In some embodiments, the chew comprises ten or more of chicken meal, pea protein, tapioca flour, pea flour, chicken fat, pea fiber, tuna meal, chicken liver, white fish meal, a flavoring agent, dried brewer's yeast, hemp extract, potassium chloride, calcium carbonate, citric acid, rosemary powder, and an antioxidant blend.

In some embodiments, the chew comprises eleven or more of chicken meal, pea protein, tapioca flour, pea flour, chicken fat, pea fiber, tuna meal, chicken liver, white fish meal, a flavoring agent, dried brewer's yeast, hemp extract, potassium chloride, calcium carbonate, citric acid, rosemary powder, and an antioxidant blend.

In some embodiments, the chew comprises twelve or more of chicken meal, pea protein, tapioca flour, pea flour, chicken fat, pea fiber, tuna meal, chicken liver, white fish meal, a flavoring agent, dried brewer's yeast, hemp extract, potassium chloride, calcium carbonate, citric acid, rosemary powder, and an antioxidant blend.

In some embodiments, the chew comprises thirteen or more of chicken meal, pea protein, tapioca flour, pea flour, chicken fat, pea fiber, tuna meal, chicken liver, white fish meal, a flavoring agent, dried brewer's yeast, hemp extract, potassium chloride, calcium carbonate, citric acid, rosemary powder, and an antioxidant blend.

In some embodiments, the chew comprises fourteen or more of chicken meal, pea protein, tapioca flour, pea flour, chicken fat, pea fiber, tuna meal, chicken liver, white fish meal, a flavoring agent, dried brewer's yeast, hemp extract, potassium chloride, calcium carbonate, citric acid, rosemary powder, and an antioxidant blend.

In some embodiments, the chew comprises fifteen or more of chicken meal, pea protein, tapioca flour, pea flour, chicken fat, pea fiber, tuna meal, chicken liver, white fish meal, a flavoring agent, dried brewer's yeast, hemp extract, potassium chloride, calcium carbonate, citric acid, rosemary powder, and an antioxidant blend.

In some embodiments, the chew comprises sixteen or more of chicken meal, pea protein, tapioca flour, pea flour, chicken fat, pea fiber, tuna meal, chicken liver, white fish meal, a flavoring agent, dried brewer's yeast, hemp extract, potassium chloride, calcium carbonate, citric acid, rosemary powder, and an antioxidant blend.

In some embodiments, the chew comprises each of chicken meal, pea protein, tapioca flour, pea flour, chicken fat, pea fiber, tuna meal, chicken liver, white fish meal, a flavoring agent, dried brewer's yeast, hemp extract, potassium chloride, calcium carbonate, citric acid, rosemary powder, and an antioxidant blend.

In some embodiments, the chew comprises:
about 20% to about 24% wt/wt chicken meal;
about 18% to about 22% wt/wt pea protein;
about 18% to about 22% wt/wt tapioca flour;
about 7.5% to about 11.5% wt/wt pea flour;
about 2.5% to about 6.5% wt/wt chicken fat;
about 1.6% to about 5.6% wt/wt pea fiber;
about 1.2% to about 5.2% wt/wt tuna meal;
about 1.2% to about 5.2% wt/wt chicken liver;
about 1.2% to about 5.2% wt/wt white fish meal;
about 1.2% to about 5.2% wt/wt of a flavoring agent;
about 1% to about 5% wt/wt dried brewer's yeast;
about 1% to about 5% wt/wt hemp extract;
about 0.1% to about 1.5% wt/wt potassium chloride;
about 0.1% to about 1.5% wt/wt calcium carbonate;
about 0.05% to about 1.0% wt/wt citric acid;
about 0.01% to about 1.0% wt/wt rosemary powder; and
about 0.01% to about 1.0% wt/wt an antioxidant blend.

In some embodiments, the chew comprises: about 22.02% wt/wt chicken meal, about 20% wt/wt pea protein, about 20% wt/wt tapioca flour, about 9.5% wt/wt pea flour, about 4.5% wt/wt chicken fat, about 3.6% wt/wt pea fiber, about 3.2% wt/wt tuna meal, about 3.2% wt/wt chicken liver, about 3.2% wt/wt white fish meal, about 3.2% wt/wt of a flavoring agent, about 3% wt/wt dried brewer's yeast, about 3% wt/wt hemp extract, about 0.59% wt/wt potassium chloride, about 0.49% wt/wt calcium carbonate, about 0.3% wt/wt citric acid, about 0.1% wt/wt rosemary powder, and about 0.1% wt/wt an antioxidant blend.

In an embodiment, the dosage form is formulated as a paste for oral administration.

In an embodiment, the paste comprises one or more of soy oil, dextrose, dried chicken liver, silica, inulin, polysorbate 60, potassium sorbate, sorbic acid, saccharin, mixed tocopherols, methylparaben, propylparaben, and combinations thereof.

In an embodiment, the paste comprises any two, three, four, five, six, seven, eight, nine, ten, eleven, or more of soy oil, dextrose, dried chicken liver, silica, inulin, polysorbate 60, potassium sorbate, sorbic acid, saccharin, mixed tocopherols, methylparaben, and propylparaben.

In an embodiment, the paste comprises any one of soy oil, dextrose, dried chicken liver, silica, inulin, polysorbate 60, potassium sorbate, sorbic acid, saccharin, mixed tocopherols, methylparaben, and propylparaben.

In an embodiment, the paste comprises any two of soy oil, dextrose, dried chicken liver, silica, inulin, polysorbate 60, potassium sorbate, sorbic acid, saccharin, mixed tocopherols, methylparaben, and propylparaben.

In an embodiment, the paste comprises any three of soy oil, dextrose, dried chicken liver, silica, inulin, polysorbate 60, potassium sorbate, sorbic acid, saccharin, mixed tocopherols, methylparaben, and propylparaben.

In an embodiment, the paste comprises any four of soy oil, dextrose, dried chicken liver, silica, inulin, polysorbate 60, potassium sorbate, sorbic acid, saccharin, mixed tocopherols, methylparaben, and propylparaben.

In an embodiment, the paste comprises any five of soy oil, dextrose, dried chicken liver, silica, inulin, polysorbate 60, potassium sorbate, sorbic acid, saccharin, mixed tocopherols, methylparaben, and propylparaben.

In an embodiment, the paste comprises any six of soy oil, dextrose, dried chicken liver, silica, inulin, polysorbate 60, potassium sorbate, sorbic acid, saccharin, mixed tocopherols, methylparaben, and propylparaben.

In an embodiment, the paste comprises any seven of soy oil, dextrose, dried chicken liver, silica, inulin, polysorbate 60, potassium sorbate, sorbic acid, saccharin, mixed tocopherols, methylparaben, and propylparaben.

In an embodiment, the paste comprises any eight of soy oil, dextrose, dried chicken liver, silica, inulin, polysorbate 60, potassium sorbate, sorbic acid, saccharin, mixed tocopherols, methylparaben, and propylparaben.

In an embodiment, the paste comprises any nine of soy oil, dextrose, dried chicken liver, silica, inulin, polysorbate 60, potassium sorbate, sorbic acid, saccharin, mixed tocopherols, methylparaben, and propylparaben.

In an embodiment, the paste comprises any ten of soy oil, dextrose, dried chicken liver, silica, inulin, polysorbate 60, potassium sorbate, sorbic acid, saccharin, mixed tocopherols, methylparaben, and propylparaben.

In an embodiment, the paste comprises any eleven of soy oil, dextrose, dried chicken liver, silica, inulin, polysorbate 60, potassium sorbate, sorbic acid, saccharin, mixed tocopherols, methylparaben, and propylparaben.

In an embodiment, the paste comprises each of soy oil, dextrose, dried chicken liver, silica, inulin, polysorbate 60, potassium sorbate, sorbic acid, saccharin, mixed tocopherols, methylparaben, and propylparaben.

In an embodiment, the composition is formulated with a carrier. In an embodiment, the composition is formulated with a carrier comprising an oil. In another embodiment, the carrier is selected from the group consisting of linseed oil, olive oil, fish oil, salmon oil, coconut oil, catnip oil, sesame oil, MCT oil, lecithin, carboxypolymethylene, grapeseed oil, and hemp seed oil. In yet another embodiment, the carrier is grapeseed oil. In yet another embodiment, the carrier is hemp seed oil.

In an embodiment, the flavoring agent is selected from the group consisting of catnip oil, chicken liver powder, poultry extract, maltodextrin, butter, and bacon. In another embodiment, the flavoring agent is chicken liver powder.

In an embodiment, the dosage form is formulated as a gel for oral administration. In some embodiments the gel is a hydrophilic and/or aqueous gel formulation.

In some embodiments, the paste comprises 1-10 mg/g of cannabidiol.

In some embodiments, the paste comprises 1-10 mg/g of cannabidiolic acid.

In some embodiments, the paste comprises 1 mg/g or less of Δ9-tetrahydrocannabinol (e.g., a paste comprising from 1 mg/g Δ9-tetrahydrocannabinol to 0.01 mg/g Δ9-tetrahydrocannabinol). In some embodiments, the paste comprises no detectable Δ9-tetrahydrocannabinol.

In some embodiments, the paste comprises 1 mg/g or less of Δ9-tetrahydrocannabinolic acid (e.g., a paste comprising from 1 mg/g Δ9-tetrahydrocannabinolic acid to 0.01 mg/g Δ9-tetrahydrocannabinolic acid). In some embodiments, the paste comprises no detectable Δ9-tetrahydrocannabinolic acid.

In some embodiments, the paste comprises 1 mg/g or less of cannabigerol (e.g., a paste comprising from 1 mg/g cannabigerol to 0.01 mg/g cannabigerol.

In some embodiments, the paste comprises 1 mg/g or less of cannabigerolic acid (e.g., a paste comprising from 1 mg/g cannabigerolic acid to 0.01 mg/g cannabigerolic acid.

In some embodiments, the paste comprises 1-10 mg/g of cannabidiol; 1-10 mg/g of cannabidiolic acid; 1 mg/g or less of Δ9-tetrahydrocannabinol; 1 mg/g or less of Δ9-tetrahydrocannabinolic acid; 1 mg/g or less of cannabigerol; and 1 mg/g or less of cannabigerolic acid.

In some embodiments, the paste comprises about 6.5 mg/g of cannabidiol.

In some embodiments, the paste comprises about 6.5 mg/g of cannabidiolic acid.

In some embodiments, the paste comprises about 0.25 mg/g of Δ9-tetrahydrocannabinol.

In some embodiments, the paste comprises about 0.17 mg/g of Δ9-tetrahydrocannabinolic acid.

In some embodiments, the paste comprises about 0.13 mg/g of cannabigerol.

In some embodiments, the paste comprises about 0.13 mg/g of cannabigerolic acid.

In some embodiments, the paste comprises about 6.5 mg/g of cannabidiol; about 6.5 mg/g of cannabidiolic acid; about 0.25 mg/g of Δ9-tetrahydrocannabinol; about 0.17 mg/g of Δ9-tetrahydrocannabinolic acid; about 0.13 mg/g of cannabigerol; and about 0.13 mg/g of cannabigerolic acid.

Methods of Treatment

In an aspect, provided herein is a method for treating or preventing pain in a veterinary subject in need thereof, comprising administering to the subject a therapeutically effective amount of any of the compositions, chews, or pastes described above.

In an embodiment, the pain is associated with arthritis, post-operative pain, acute pain, dental pain, pain associated with gingivitis, joint pain, or multi-joint pain.

In an embodiment, the administration of the composition, chew, or paste is accomplished orally. When a pharmaceutical composition is employed, the administration may be accomplished by feeding the pharmaceutical composition to the veterinary subject.

When a chew is employed, the administration may be accomplished by feeding the chew to the veterinary subject. In embodiments employing a chew, the chew is designed to be offered to veterinary subjects as treats or food supplements. Chews may be packed in bags or another container which allows the animal owner to obtain counted amounts of chew(s) and, therefore, administer the desirable dose as a number of chews. In other embodiments, the composition is administered as one or more single-dose sachets.

When a paste or gel is employed, the administration may be accomplished by applying the paste to a luminal surface(s) of the oral cavity. An applicator may be used to spread the paste onto, for example, the inner surfaces of the cheeks or the gums of the veterinary subject. In some embodiments employing a paste or gel, the paste or gel is added to the food bowl, mixed with wet or dry food, or given directly into the mouth (either by holding the veterinary subject and delivering the paste directly into the back of the mouth or by offering the paste to the cat from a tube or syringe). In some embodiments, the paste or gel is packed in a 'dial-a-dose' tube/syringe that allows the user to measure the amount to be delivered before pushing the plunger. In other embodiments, the paste or gel is provided in one or more single-dose sachets.

In an embodiment, the veterinary subject is a feline. In an embodiment, the feline is a domestic cat. In some embodiments, the feline is a big cat. In some embodiments, the feline is a tiger, lion, jaguars, panther, bobcat, lynx, or leopard.

In an embodiment, the pharmaceutical composition or dosage form is administered at a dosage of about 0.1-15.0 mg/kg of hemp extract. In another embodiment, the pharmaceutical composition or dosage form is administered at a dosage of about 0.1-10.0 mg/kg of hemp extract. In an embodiment, the pharmaceutical composition or dosage form is administered at a dosage of about 0.1-8.0 mg/kg of hemp extract. In yet another embodiment, the pharmaceutical composition or dosage form is administered at a dosage of about 0.1 mg/kg of hemp extract. In still another embodiment, the pharmaceutical composition or dosage form is administered at a dosage of about 0.2 mg/kg of hemp extract. In yet another embodiment, the pharmaceutical composition or dosage form is administered at a dosage of about 0.3 mg/kg of hemp extract. In an embodiment, the pharmaceutical composition or dosage form is administered at a dosage of about 0.4 mg/kg of hemp extract. In another embodiment, the pharmaceutical composition or dosage form is administered at a dosage of about 0.5 mg/kg of hemp extract. In yet another embodiment, the pharmaceutical composition or dosage form is administered at a dosage of about 0.6 mg/kg of hemp extract. In still another embodiment, the pharmaceutical composition or dosage form is administered at a dosage of about 0.7 mg/kg of hemp extract. In yet another embodiment, the pharmaceutical composition or dosage form is administered at a dosage of about 0.8 mg/kg of hemp extract. In an embodiment, the pharmaceutical composition or dosage form is administered at a dosage of about 0.9 mg/kg of hemp extract. In another embodiment, the pharmaceutical composition or dosage form is administered at a dosage of about 1 mg/kg of hemp extract. In yet another embodiment, the pharmaceutical composition or dosage form is administered at a dosage of about 1.5 mg/kg of hemp extract. In still another embodiment, the pharmaceutical composition or dosage form is administered at a dosage of about 2 mg/kg of hemp extract. In an embodiment, the pharmaceutical composition or dosage form is administered at a dosage of about 3 mg/kg of hemp extract. In another embodiment, the pharmaceutical composition or dosage form is administered at a dosage of about 4 mg/kg of hemp extract. In yet another embodiment, the pharmaceutical composition or dosage form is administered at a dosage of about 5 mg/kg of hemp extract. In still another embodiment, the pharmaceutical composition or dosage form is administered at a dosage of about 6 mg/kg of hemp extract. In an embodiment, the pharmaceutical composition or dosage form is administered at a dosage of about 7 mg/kg of hemp extract. In another embodiment, the pharmaceutical composition or dosage form is administered at a dosage of about 8 mg/kg of hemp extract. In yet another embodiment, the pharmaceutical composition or dosage form is administered at a dosage of about 9 mg/kg of hemp extract. In still another embodiment, the pharmaceutical composition or dosage form is administered at a dosage of about 10 mg/kg of hemp extract. In an embodiment, the pharmaceutical composition or dosage form is administered at a dosage of about 11 mg/kg of hemp extract. In another embodiment, the pharmaceutical composition or dosage form is administered at a dosage of about 12 mg/kg of hemp extract. In yet another embodiment, the pharmaceutical composition or dosage form is administered at a dosage of about 13 mg/kg of hemp extract. In still another embodiment, the pharmaceutical composition or dosage form is administered at a dosage of about 14 mg/kg of hemp extract. In an embodiment, the pharmaceutical composition or dosage form is administered at a dosage of about 15 mg/kg of hemp extract.

In another embodiment, the pharmaceutical composition or dosage form is administered at twice a therapeutically effective dosage for one week, and then subsequently administered at the therapeutically effective dosage. In yet another embodiment, the therapeutically effective dosage is about 0.1-0.5 mg/kg of hemp extract. In still another embodiment, the therapeutically effective dosage is about 2 mg/kg of hemp extract. In an embodiment, the therapeutically effective dosage is about 8 mg/kg of hemp extract.

In an embodiment, the pharmaceutical composition or dosage form is administered at a dosage of about 1 mg/kg of hemp extract for one week, and then subsequently administered at a dosage of about 0.1-0.5 mg/kg of hemp extract. In another embodiment, the pharmaceutical composition or dosage form is administered at a dosage of about 4 mg/kg of hemp extract for one week, and then subsequently administered at a dosage of about 2 mg/kg of hemp extract.

In an embodiment, the pharmaceutical composition or dosage form is administered at a dosage of about 2 mg/kg of hemp extract every 12 hours for two weeks, then subsequently administered at a dosage of about 1 mg/kg of hemp extract every 12 hours for two weeks, and then subsequently administered at a dosage of about 2 mg/kg of hemp extract every 12 hours for four weeks.

In an embodiment, the pharmaceutical composition or dosage form is administered at a dosage of about 1.0 mg/kg of hemp extract once daily. In an embodiment, the pharmaceutical composition or dosage form is administered at a dosage of about 1.0 mg/kg of hemp extract twice daily. In an embodiment, the pharmaceutical composition or dosage form is administered at a dosage of about 1.0 mg/kg of hemp extract three times daily. In an embodiment, the pharmaceutical composition or dosage form is administered at a dosage of about 1.0 mg/kg of hemp extract four times daily.

In an embodiment, the pharmaceutical composition or dosage form is administered at a dosage of about 2.0 mg/kg of hemp extract once daily. In an embodiment, the pharmaceutical composition or dosage form is administered at a dosage of about 2.0 mg/kg of hemp extract twice daily. In an embodiment, the pharmaceutical composition or dosage form is administered at a dosage of about 2.0 mg/kg of hemp extract three times daily. In an embodiment, the pharmaceutical composition or dosage form is administered at a dosage of about 2.0 mg/kg of hemp extract four times daily.

In an embodiment, the pharmaceutical composition or dosage form is administered at a dosage of about 3.0 mg/kg of hemp extract once daily. In an embodiment, the pharmaceutical composition or dosage form is administered at a dosage of about 3.0 mg/kg of hemp extract twice daily. In an embodiment, the pharmaceutical composition or dosage form is administered at a dosage of about 3.0 mg/kg of hemp extract three times daily. In an embodiment, the pharmaceutical composition or dosage form is administered at a dosage of about 3.0 mg/kg of hemp extract four times daily.

In an embodiment, the pharmaceutical composition or dosage form is administered at a dosage of about 4.0 mg/kg of hemp extract once daily. In an embodiment, the pharmaceutical composition or dosage form is administered at a dosage of about 4.0 mg/kg of hemp extract twice daily. In an embodiment, the pharmaceutical composition or dosage form is administered at a dosage of about 4.0 mg/kg of hemp extract three times daily. In an embodiment, the pharmaceutical composition or dosage form is administered at a dosage of about 4.0 mg/kg of hemp extract four times daily. In an embodiment, the pharmaceutical composition or dosage form is administered at a dosage of about 5.0 mg/kg of hemp extract once daily. In an embodiment, the pharmaceutical composition or dosage form is administered at a dosage of about 5.0 mg/kg of hemp extract twice daily. In an embodiment, the pharmaceutical composition or dosage form is administered at a dosage of about 5.0 mg/kg of hemp extract three times daily. In an embodiment, the pharmaceutical composition or dosage form is administered at a dosage of about 5.0 mg/kg of hemp extract four times daily.

In an embodiment, the pharmaceutical composition or dosage form is administered at a dosage of about 6.0 mg/kg of hemp extract once daily. In an embodiment, the pharmaceutical composition or dosage form is administered at a dosage of about 6.0 mg/kg of hemp extract twice daily. In an embodiment, the pharmaceutical composition or dosage form is administered at a dosage of about 6.0 mg/kg of hemp extract three times daily. In an embodiment, the pharmaceutical composition or dosage form is administered at a dosage of about 6.0 mg/kg of hemp extract four times daily.

In an embodiment, the pharmaceutical composition or dosage form is administered at a dosage of about 7.0 mg/kg of hemp extract once daily. In an embodiment, the pharmaceutical composition or dosage form is administered at a dosage of about 7.0 mg/kg of hemp extract twice daily. In an embodiment, the pharmaceutical composition or dosage form is administered at a dosage of about 7.0 mg/kg of hemp extract three times daily. In an embodiment, the pharmaceutical composition or dosage form is administered at a dosage of about 7.0 mg/kg of hemp extract four times daily.

In an embodiment, the pharmaceutical composition or dosage form is administered at a dosage of about 8.0 mg/kg of hemp extract once daily. In an embodiment, the pharmaceutical composition or dosage form is administered at a dosage of about 8.0 mg/kg of hemp extract twice daily. In an embodiment, the pharmaceutical composition or dosage form is administered at a dosage of about 8.0 mg/kg of hemp extract three times daily. In an embodiment, the pharmaceutical composition or dosage form is administered at a dosage of about 8.0 mg/kg of hemp extract four times daily.

In an embodiment, the pharmaceutical composition or dosage form is administered at a dosage of about 9.0 mg/kg of hemp extract once daily. In an embodiment, the pharmaceutical composition or dosage form is administered at a dosage of about 9.0 mg/kg of hemp extract twice daily. In an embodiment, the pharmaceutical composition or dosage form is administered at a dosage of about 9.0 mg/kg of hemp extract three times daily. In an embodiment, the pharmaceutical composition or dosage form is administered at a dosage of about 9.0 mg/kg of hemp extract four times daily.

In an embodiment, the pharmaceutical composition or dosage form is administered at a dosage of about 10.0 mg/kg of hemp extract once daily. In an embodiment, the pharmaceutical composition or dosage form is administered at a dosage of about 10.0 mg/kg of hemp extract twice daily. In an embodiment, the pharmaceutical composition or dosage form is administered at a dosage of about 10.0 mg/kg of hemp extract three times daily. In an embodiment, the pharmaceutical composition or dosage form is administered at a dosage of about 10.0 mg/kg of hemp extract four times daily.

In an embodiment, the veterinary subject is canine, feline, bovine, porcine, or equine. In another embodiment, the veterinary subject is canine. In yet another embodiment, the veterinary subject is feline.

In an aspect, provided herein is a method for treating or preventing pain associated with arthritis, post-operative pain, acute pain, dental pain, pain associated with gingivitis, joint pain, or multi-joint pain in a veterinary subject in need thereof, comprising administering to the subject a therapeutically effective amount of hemp extract.

In an embodiment, the hemp extract is administered at a dosage of about 0.1-15.0 mg/kg of hemp extract. In another embodiment, the hemp extract is administered at a dosage of about 0.1-10.0 mg/kg of hemp extract. In yet another embodiment, the hemp extract is administered at a dosage of about 0.1 mg/kg of hemp extract. In still another embodiment, the hemp extract is administered at a dosage of about 0.2 mg/kg of hemp extract. In yet another embodiment, the hemp extract is administered at a dosage of about 0.3 mg/kg of hemp extract. In an embodiment, the hemp extract is administered at a dosage of about 0.4 mg/kg of hemp extract. In another embodiment, the hemp extract is administered at a dosage of about 0.5 mg/kg of hemp extract. In yet another embodiment, the hemp extract is administered at a dosage of about 0.6 mg/kg of hemp extract. In still another embodiment, the hemp extract is administered at a dosage of about 0.7 mg/kg of hemp extract. In yet another embodiment, the hemp extract is administered at a dosage of about 0.8 mg/kg of hemp extract. In an embodiment, the hemp extract is administered at a dosage of about 0.9 mg/kg of hemp extract. In another embodiment, the hemp extract is administered at a dosage of about 1 mg/kg of hemp extract. In yet another embodiment, the hemp extract is administered at a dosage of about 1.5 mg/kg of hemp extract. In still another embodiment, the hemp extract is administered at a dosage of about 2 mg/kg of hemp extract. In an embodiment, the hemp extract is administered at a dosage of about 3 mg/kg of hemp extract. In another embodiment, the hemp extract is administered at a dosage of about 4 mg/kg of hemp extract. In yet another embodiment, the hemp extract is administered at a dosage of about 5 mg/kg of hemp extract. In still another embodiment, the hemp extract is administered at a dosage of about 6 mg/kg of hemp extract. In an embodiment, the hemp extract is administered at a dosage of about 7 mg/kg of hemp extract. In another embodiment, the hemp extract is administered at a dosage of about 8 mg/kg of hemp extract. In yet another embodiment, the hemp extract is administered at a dosage of about 9 mg/kg of hemp extract. In still another embodiment, the hemp extract is administered at a dosage of about 10 mg/kg of hemp extract. In an embodiment, the hemp extract is administered at a dosage of about 11 mg/kg of hemp extract. In another embodiment, the hemp extract is administered at a dosage of about 12 mg/kg of hemp extract. In yet another embodiment, the hemp extract is administered at a dosage of about 13 mg/kg of hemp extract. In still another embodiment, the hemp extract is administered at a dosage of about 14 mg/kg of hemp extract. In an embodiment, the hemp extract is administered at a dosage of about 15 mg/kg of hemp extract.

In another embodiment, the hemp extract is administered at twice the therapeutically effective dosage for one week, and then subsequently administered at a therapeutically effective dosage. In yet another embodiment, the therapeutically effective dosage is about 0.1-0.5 mg/kg of hemp extract. In still another embodiment, the therapeutically effective dosage is about 2 mg/kg of hemp extract. In an embodiment, the therapeutically effective dosage is about 8 mg/kg of hemp extract.

In an embodiment, the hemp extract is administered at a dosage of about 1 mg/kg of hemp extract for one week, and then subsequently administered at a dosage of about 0.1-0.5 mg/kg of hemp extract. In another embodiment, the hemp extract is administered at a dosage of about 4 mg/kg of hemp extract for one week, and then subsequently administered at a dosage of about 2 mg/kg of hemp extract.

In an embodiment, the method results in a therapeutically effective median maximal serum concentration of cannabidiol. In another embodiment, the median maximal serum concentration of cannabidiol is about 90-310 ng/mL. In yet another embodiment, the median maximal serum concentration of cannabidiol is about 90 ng/mL. In still another embodiment, the median maximal serum concentration of cannabidiol is about 100 ng/mL. In still another embodiment, the median maximal serum concentration of cannabidiol is about 102 ng/ml. In an embodiment, the median maximal serum concentration of cannabidiol is about 200 ng/mL. In another embodiment, the median maximal serum concentration of cannabidiol is about 300 ng/mL. In yet another embodiment, the median maximal serum concentration of cannabidiol is about 400 ng/mL. In still another embodiment, the median maximal serum concentration of cannabidiol is about 500 ng/mL. In an embodiment, the median maximal serum concentration of cannabidiol is about 590 ng/mL. In another embodiment, the median maximal serum concentration of cannabidiol is about 600 ng/mL.

In an embodiment, the method results in a therapeutically effective median maximal serum concentration of cannabigerol. In another embodiment, the median maximal serum concentration of cannabigerol is about 90-310 ng/mL. In yet another embodiment, the median maximal serum concentration of cannabigerol is about 90 ng/mL. In still another embodiment, the median maximal serum concentration of cannabigerol is about 100 ng/mL. In still another embodiment, the median maximal serum concentration of cannabigerol is about 102 ng/mL. In an embodiment, the median maximal serum concentration of cannabigerol is about 200 ng/mL. In another embodiment, the median maximal serum concentration of cannabigerol is about 300 ng/mL. In yet another embodiment, the median maximal serum concentration of cannabigerol is about 400 ng/mL. In still another embodiment, the median maximal serum concentration of cannabigerol is about 500 ng/mL. In an embodiment, the median maximal serum concentration of cannabigerol is about 590 ng/mL. In another embodiment, the median maximal serum concentration of cannabigerol is about 600 ng/mL.

The therapeutic compositions of the invention will be administered with suitable carriers, excipients, and other agents that are incorporated into formulations to provide improved transfer, delivery, tolerance, and the like. A multitude of appropriate formulations can be found in the formulary known to all pharmaceutical chemists: Remington's Pharmaceutical Sciences, Mack Publishing Company, Easton, PA. These formulations include, for example, powders, pastes, ointments, jellies, waxes, oils, lipids, lipid (cationic or anionic) containing vesicles (such as LIPOFECTIN™), DNA conjugates, anhydrous absorption pastes, oil-in-water and water-in-oil emulsions, emulsions carbowax (polyethylene glycols of various molecular weights), semi-solid gels, and semi-solid mixtures containing carbowax. See also, Powell et al. "Compendium of excipients for parenteral formulations" PDA (1998) J Pharm Sci Technol 52:238-311.

The dose may vary depending upon the age and the weight of a subject to be administered, target disease, conditions, route of administration, and the like. Various delivery systems are known and can be used to administer the pharmaceutical composition of the invention, e.g., encapsulation in liposomes, microparticles, microcapsules, receptor-mediated endocytosis (see, e.g., Wu et al. (1987) J. Biol. Chem. 262:4429-4432).

Advantageously, the pharmaceutical compositions and dosage forms for oral use described above are prepared into dosage forms in a unit dose suited to fit a dose of the active ingredients. Such dosage forms in a unit dose include, for example, chews and pastes for oral application.

In an embodiment for non-human animal administration, the term "pharmaceutical" as used herein may be replaced by "veterinary."

EXAMPLES

Example 1—Pharmacokinetic Study of Hemp Extract Paste in Cats

A study is being conducted to assesses the pharmacokinetics of a hemp oil paste in cats. The hemp oil comprises a mix of cannabinoids with about 90% of the mix being CBD and CBDA. In this study, a population of 10 cats are assessed (5 male cats and 5 female cats). The cats weigh between 4.08 kg and 5.35 kg. Information about the cats is shown in Table 1, below.

TABLE 1

Cats Used in the Study

| Animal ID | Sex | DOB | Body Weight (kg) (Day - 6) |
|---|---|---|---|
| M196662 | F | 25 Aug. 2019 | 4.845 |
| 18FQQ2 | F | 23 Oct. 2018 | 4.570 |
| 18MQI5 | F | 31 Oct. 2018 | 4.175 |
| 18FQF2 | M | 23 Oct. 2018 | 5.030 |
| 18MQY6 | F | 11 Nov. 2018 | 4.080 |
| 18MGB2 | M | 26 Mar. 2018 | 5.275 |
| 18FQM2 | M | 25 Oct. 2018 | 4.975 |
| 17LFJ2 | M | 12 Apr. 2017 | 5.350 |
| 18FQC6 | F | 21 Oct. 2018 | 4.330 |
| M194792 | M | 8 Aug. 2019 | 5.085 |

The study is a single group design. Five males and five females have been selected from six males and six females and were allocated to a single study group consisting of 10 cats total. The group received the CDB-CBDA paste (TA) as a single dose on Day 0, followed by twice daily doses on Days 1 to 6 at 12-hour (h) intervals (±1 hour).

Animals are fed Feline Laboratory Diet 5003, PMI Nutrition International, St. Louis, MO or other appropriate feline diet. Animals are allowed treats during the acclimation and treatment phase to aid in acceptance of the oral administration of the TA. Treats may be in crunchy, chewy or paste form, but do not contain the active TA ingredient. Water provided to the cats is also monitored for quality.

The TA is described in Table 2, below.

TABLE 2

CBD-CBDA Paste

| | |
|---|---|
| Name: | CBD + CDBA-Rich Palatable Paste |
| Batch number and expiry: | To be documented in the study records |
| Description/active ingredients: | Hemp extract (10 mg cannabinoids/mL) |
| Packaging: | 32 mL dial-a-dose syringe |
| Date of manufacture: | To be documented in the study records |
| Storage requirements: | Room temperature |
| Manufactured by: | Vet Plus Inc |

The study is conducted according to the following schedule shown in Table 3, below.

TABLE 3

Study Schedule

| Dayx | Event |
|---|---|
| −7 | Start of 7-day acclimatisation period Start daily observations Physical examination, body weight and clinical pathology (once between days −7 and −5) |
| −1 | Inclusion (removal of extra animals) |

TABLE 3-continued

Study Schedule

| Dayx | Event |
|---|---|
| 0 | Daily observations, TA administration (×1), PK blood collection prior to and at 0.5, 1, 2, 4 and 8 hours post dose, physical examination at 1 and 4 hours post dose |
| 1 | Daily observations, TA administration (×2), physical examination at 24 hours post initial dose of TA |
| 2 | Daily observations, TA administration (×2), physical examination |
| 3 | Daily observations, TA administration (×2) |
| 4 | Daily observations, TA administration (×2) |
| 5 | Daily observations, TA administration (×2) |
| 6 | Daily observations, TA administration (×2), PK blood collection and clinical pathology at 6 hours post AM dose, physical examination |

Regarding the administration of the TA, fasting is not required prior to administration. On Day 0, the cats will receive a single oral dose of the TA. On Days 1 to 6, the cats will receive a single oral dose of the TA in the morning, followed by a single oral dose of the TA approximately 12 hours later (±1 hour).

Physical examinations will be performed by a veterinarian or designate on days indicated in the study schedule (Table 3). These examinations may include, but are not limited to, vital signs (pulse rate, respiratory rate and rectal temperature), mucous membranes, eyes, motility, lymph nodes, abdominal palpation, thoracic auscultation and skin condition, behavior and reproductive system, respiratory, cardiac, gastrointestinal and urinary systems.

Animals will be observed for general health once daily. These observations may include, but are not limited to, habitus, color of urine, color and consistency of feces (dry, normal, soft, diarrhea, blood in feces), salivation, vomiting, skin lesions and an obvious change in general condition.

The cats will be weighed on the day as indicated in the study schedule (Table 3). Body weights will be recorded with decimal points as displayed by the scale.

Blood samples will be obtained at each dosing period on the following schedule:
Prior to dosing on Day 0
Post-dosing at the following times:
0.5 h (±1 min)
1 h (±1 min)
2 h (±2 min)
4 h (±5 min)
8 h (±10 min)
24 h (±30 min)

Each blood sample (approximately 2 to 3 mL) will be collected into a serum separator tubes.

Each sample will be collected by venipuncture using an appropriately sized needle and collection sleeve (or appropriately sized needle and syringe).

Blood samples will be centrifuged at room temperature for 15 min at 1,600 RCF.

Serum will be divided into two approximately equal aliquots and placed in frozen storage (approximately-70 or colder).

Blood specimens will be collected for clinical chemistry on days indicated in the study schedule (Table 3). SST collection tubes (or similar) will be used for serum analysis.

Blood samples will be used to determine the plasma levels of various cannabinoid metabolites (e.g., CBD and CBDA).

Death is not an end point in this study. A complete post-mortem examination may be performed on any animal that dies during the study or that is subjected to euthanasia for ethical reason after TA administration. The need for a complete post-mortem examination will be confirmed by discussion between the Study Director and Sponsor Representative.

Any clinical sign or event observed that is unfavorable and unintended, that occurs anytime during the study after test article administration is considered an adverse event (AE).

All AEs, regardless of severity, will be discussed in a Final Report.

Example 2—Feline Pharmacokinetic and Safety Study

A study was conducted to determine 24-hour pharmacokinetics for a CBD/CBDA rich hemp extract containing minor cannabinoids, comprising THC, THCA, cannabigerol (CBG) and cannabigerolic acid (CBGA) in cats. Additionally, the cats were treated for a one-week duration using a twice daily dosing of this hemp extract and assessed for any adverse effects (e.g., behavioral and neurological effects). Complete blood counts and serum chemistry were also examined as measures of short-term treatment safety.

Animals and Animal Health

Eight cats from a contract research laboratory (Summit Ridge Farms, Gibson, PA) were utilized for this experiment. 4 spayed female cats and 4 neutered male cats were used. For the 24 hour pharmacokinetic analysis, each cat was provided a palatable paste formulation comprising approximately 6.5 mg/g CBD, 6.5 mg/g CBDA, 0.25 mg/g THC, 0.17 mg/g THCA, 0.13 mg/g CBG, and 0.13 mg/g CBGA, as measured by third party analysis prior to study initiation. The cat population ranged from 4.1 kg to 5.4 kg (mean weight 4.7 kg). An initial dosage of 1 g of paste was fed to each cat at zero hours. Additionally, and after the initial 24-hour pharmacokinetic assessment, treatment with 1 g of paste resumed on the next day for 6 days, twice daily at 7 am and 4 pm each day. The cats were fasted prior to administration and all cats were observed to accept and eat the paste without any negative behaviors. Cats were fed their normal daily meal approximately 1 hour after oral paste consumption. The base of the paste was a proprietary mix of soy oil, dextrose, dried chicken liver, silica, inulin, polysorbate 60, potassium sorbate, sorbic acid, saccharin, mixed tocopherols, methylparaben, propylparaben in descending order of volume with 15% cannabinoid rich hemp oil emulsified with the product. Prior to enrollment all cats involved in the study were deemed healthy and normal based on physical examination, complete blood count and serum chemistry assessment. During the 1-week trial examination of all cats were assessed at the 1 and 4 hour time point after morning dosing. The assessment included examination for physical abnormalities and examination for adverse events including diarrhea, vomiting, lethargy, somnolence, ataxia, or abnormal behavior within the colony during treatment. Regarding the 24 hour pharmacokinetic study, two milliliters of blood was drawn via jugular venipuncture for all 8 cats prior to the initial dose and then again at 0.5, 1, 2, 4, 8 and 24 hours for a 7 point pharmacokinetic analysis. Complete blood counts, serum chemistry and serum cannabinoid concentrations were performed before the initial treatment and at the end of day 7 treatment, 6 hours after the morning treatment. Complete blood count data included white blood cells (WBC), hematocrit, hemoglobin, red blood cells (RBC), neutrophils, lymphocytes, platelets, monocytes, eosinophils, basophils). Serum biochemistry analyses included sodium, potassium, chloride, magnesium, calcium, phosphorus, albumin, total protein, globulin, urea nitrogen, creatinine, alkaline phosphatase (ALP), alanine aminotransferase (ALT), aspartate amino transferase (AST), cholesterol, total bilirubin, glucose and gamma glutamyl transferase (GGT) with a focus of this report being renal and hepatic parameters. All blood parameters measured were performed at the Cornell University Diagnostic Laboratory.

Serum Cannabinoids Analysis

Analysis was performed using an exploratory (fit-for-purpose) method for fast measurement of thirteen cannabinoids and their metabolites at the Toxicology Research Laboratory, University of Illinois at Chicago. The reference standards for CBD and CBDA were obtained from Restek Corporation (Bellefonte, PA); all other reference and internal standards were obtained from Cerilliant Corporation (Round Rock, TX). Cannabinoids (CBD, CBDA, THC, THCA, cannabinol [CBN], cannabichromene [CBC], cannabigerol [CBG], and cannabigerolic acid [CBGA]) and their metabolites (11-OH-tetrahydrocannabinol [11-OH-THC], 7-OH-cannabidiol [7-OH-CBD], 7-COOH cannabidiol [7-COOH-CBD], COOH-tetrahydrocannabinol [COOH-THC], and COOH-glucuroniated tetrahydrocannabinol [COOH-THC-Glu]) concentration in cat serum was determined using high performance liquid chromatography with tandem mass spectrometry (LC-MS/MS) (Nexera X2 and LCMS 8050, Shimadzu Corp., Kyoto, Japan).

Cat serum (40 µL) was mixed with 20 µL of internal standards [100 ng/mL of CBD-d3, THC-d3, THCA-d3, 7-COOH-CBD-d3, 7-OH-CBD-d5, 11-OH-THC-d3, COOH-THC-d9, and COOH-THC-Glu-d3 in water:methanol (50:50)] in a 96 well plate. Proteins were precipitated and compounds were extracted by adding 100 µL of ice-cold acetonitrile to the samples, then vortexing for 1-2 minutes and centrifuging at 4,000 rpm for 10 minutes at 4° C. Supernatants (70 µL) were mixed with 70 µL of water in a different 96 well plate, and centrifuged again. 10 µL of the processed samples were injected into WATERS™ ATLANTIS® T3 HPLC column (3 µm 2.1×50 mm) with a guard cartridge (WATERS™ VanGuard ATLANTIS® T3) coupled to LC-MS/MS (Waters Corporation, Milford, Massachusetts, United States). The column was equilibrated with mobile phase A (0.1% formic acid in water) and mobile phase B (acetonitrile) at 50% B. The compounds were eluted by a linear gradient from 50% B to 100% B over 6 minutes, and then held at 95% B for 1 minute. Subsequently, the column was re-equilibrated at initial composition for 1 minute at a flow rate of 0.3 mL/min. The autosampler and column temperature were set a 4 and 30° C., respectively. The compounds were detected in electrospray ionization positive and/or negative mode. Interface voltage and temperature were 4 kV and 300° C., respectively. Desolvation line and heat block temperatures were 250 and 400° C., respectively. Nebulizing, heating, and drying gas flow were 2.7, 5, and 5 L/min, respectively.

Concentrations of cannabinoids were calculated by LabSolutions software (Shimadzu Corp., Kyoto, Japan) using a quadratic calibration curve with $1/c^2$ weighing based on relative response (peak area of cannabinoids/peak area of internal standards).

Pharmacokinetics and Statistical Analysis

The 24 hour pharmacokinetic analysis for each hemp derived cannabinoid (CBD, CBDA, Δ9-THC, THCA, 11-OH-THC, CBC, CBCA, CBN) was performed utilizing a commercial software system that allows for a one compartment model using a 5 half-life assumption for mean serum concentration (PK solutions 2.0, Summit PK, Montrose, CO). The results generated were time to maximal concentrations (Tmax), maximum serum concentration (Cmax), half-life (T ½), area under the curve to the last time-point (AUC$_{0-24}$), mean residence time (MRT), and calculated predicted 5 half-life mean serum concentration (Css Ave). All of these cannabinoid and metabolite values were represented as the mean and the standard deviation of the week 1 serum concentrations at the midpoint of dosing values. These were compared to the predicted steady state (Css Ave) using a Student T-test with a p value set at 0.05 as the cutoff for statistical significance between calculated and true serum concentrations. Results of the complete blood counts and serum biochemistry parameters were assessed for normality using a Shapiro Wilk's test and as most data was normally distributed a paired Student's Test was used to assess changes over the week of treatment with a p value set at ≤0.05 as statistically significant.

Figure 2:
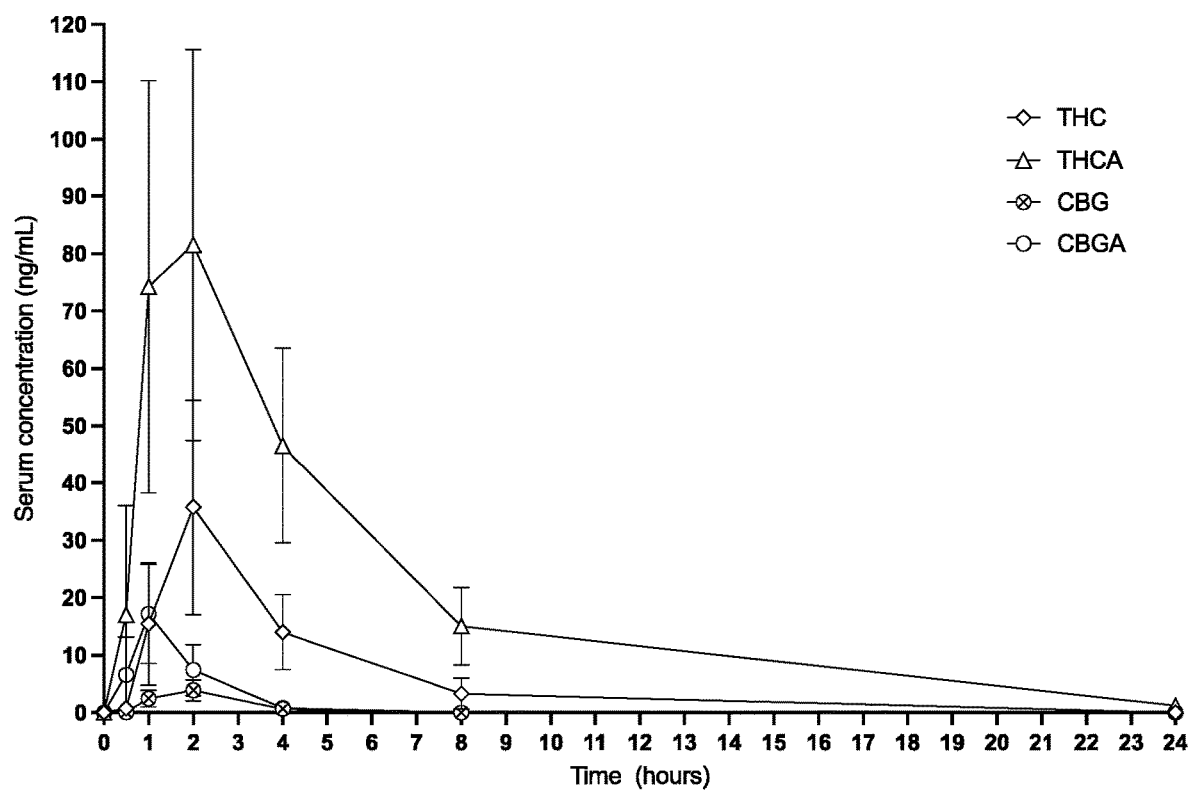
FIG. 2 is a line graph showing serum concentration of THC, THC, CBG, and CBGA in cats.
Figure 3:
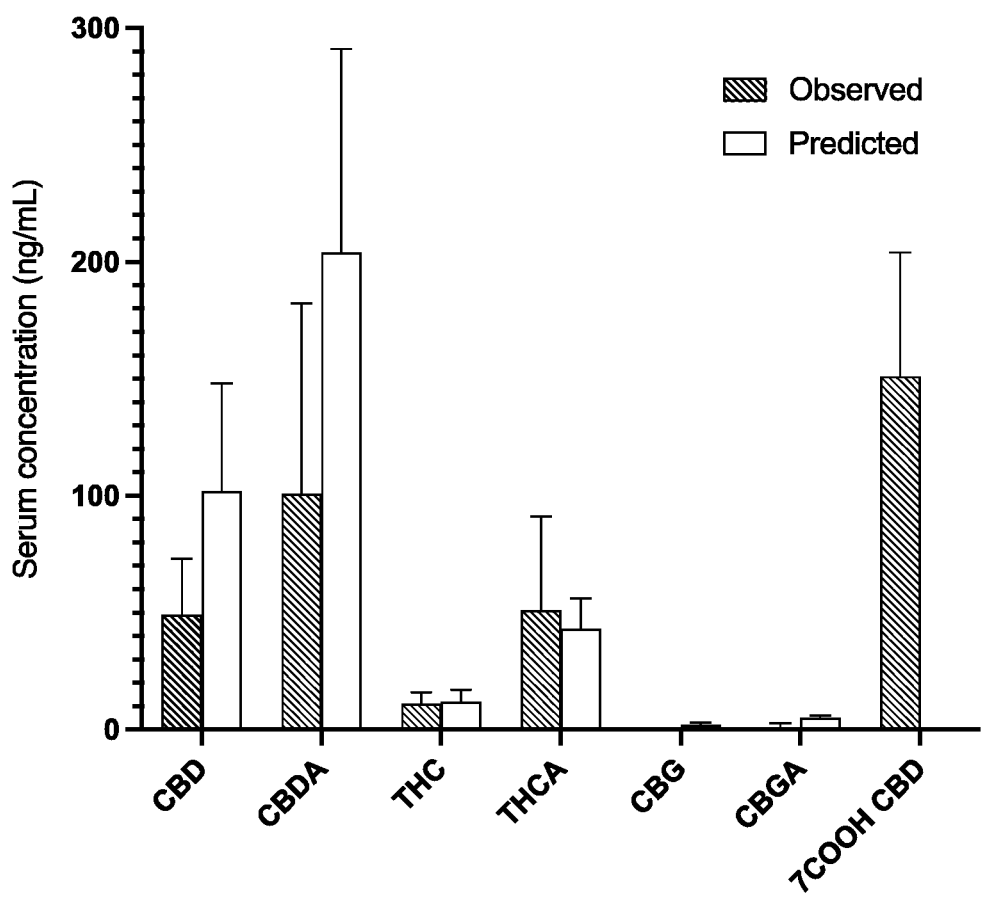
FIG. 3 is a bar graph showing observed and predicted serum concentration of CBD, CBDA, THC, THC, CBG, CBGA, and 7COOH CBD in cats.

Regarding FIGS. 1-3, any result that was below the quantifiable limit for the respective cannabinoid was considered 0 for all graphing and representation of data.

Results

Twenty four hour PK results data resulted in calculable Cmax (ng/mL), Tmax (h), T½ life (h), AUC 0-t (ng-h/mL), MRT (h), and predicted steady state average means for CBD, CBDA, CBGA and THCA for all cats. THC 24 hour PK results were only available for 7 of the 8 cats due to poor absorption in one cat. Six of the 8 cats had concentrations above the lower limit for the detection of CBG for the reporting of 24 hour PK results for CBG. All other cannabinoids or metabolites were either below the detectable limit for the analyte or less than half of the population showed any appreciable concentration in the serum of cats at any time point including 11-OH-THC, THC, COOH-THC, COOH-THC-glu, 7-OH-CBD, CBN and CBC. All mean and standard deviations across the population of cats for PK results are shown in Table 4 with FIG. 1 showing CBD, CBDA and 7-COOH-CBD metabolite 24 hour pharmacokinetics and FIG. 2 showing minor cannabinoid average serum concentrations (THC, THCA, CBG, CBGA) across time points of the 24 hour pharmacokinetics. The 7-OH-CBD could not be quantified in the cats considering 5 of the 8 cats showed no detectable concentrations of this metabolite, while the 7-COOH-CBD metabolite was found in all cats with a mean peak value of 41.4±22.2 ng/mL at 4 hours post dosing and the 1 week steady state concentration observed was 150.7±50.1 ng/ml (FIG. 1).

On day 7, at 6 hours post morning dose, cannabinoid concentrations were calculated and compared to mean calculated steady state concentrations, showing a significant difference between predicted steady state (Css Ave) and actual serum concentrations for CBD, CBDA, THC, CBG and CBGA (p<0.05). For the CBD, CBDA, THC, CBG and CBGA. The predicted concentration was higher than the actual concentration except for THCA where the predicted and actual serum concentration were no different (p=0.63; FIG. 3).

Physical Examination Complete Blood Count and Selected Serum Chemistry Parameters All cats were examined for adverse events after initial dosing and after morning dosing on each day of the trial. No adverse events regarding vomiting, diarrhea, hypersalivation, or head shaking were noted at dosing. Examinations for adverse events were performed 1 hour and 4 hours after morning dose during the week. Neurologically or behaviorally no mydriasis, ataxia, somnolence, lethargy or abnormal behavior was observed. Complete blood count assessments before and after treatment showed a mild significant decrease in white blood cell (P=0.02), segmented neutrophil (P=0.03), monocytes (P=0.02), eosinophil (P=0.04) and basophil concentrations (P=0.03; Table 5) with no values at either the initiation of one week after treatment being outside of the normal reference range for any parameter.

Serum renal and hepatic chemistry parameters showed a number of mild alterations. Serum albumin, globulin and total protein were mildly decreased after one week of treatment (Table 5). However no parameters were outside the normal reference range at either time point. Serum creatinine, urea nitrogen and calcium were no different between the time points, however phosphorus was significantly lower after a week of treatment (P<0.01), but values did not fall outside of the reference range for any phosphorus values. There was a mild significant ALT elevation (P<0.01) compared to baseline after one week of treatment, however no values were outside of the reference range prior to treatment or after one week of treatment. ALP and AST values were not significantly elevated, however two cats had elevations of alkaline phosphatase outside of the reference range prior to initiation of treatment and only 1 remained just above the reference range 1 week after treatment. Serum cholesterol was mildly decreased (P<0.01) after the 1 week of treatment, however none of the values before or after treatment were outside of the reference range.

In our study, CBD and THC were tested in combination with CBDA, THCA and CBGA, with a CBD and CBDA dosage of 1.38 mg/kg, and 25-fold less amounts of CBG, CBGA, THC and THCA. All cats had normal CBC and serum chemistry profiles within the reference range, with no observed physical or behavioral adverse effects. Yet in the complete blood count data there were some decreases over the week which may be related to the timing of the blood draws as blood pre study was taken at 7 am and blood for the 1 week follow up was taken at approximately 1 pm in the afternoon. Additionally, serum chemistry alterations were observed for blood proteins and cholesterol may have also been related to timing of blood draw which is a limitation of this study since a placebo group was not included.

So far, no study has been reported on the safety and tolerability for the acidic forms of cannabinoids in cats. Herein, CBDA, along with THCA and CBGA were administrated with dosage of 1.13, 0.05, 0.03 mg/kg, respectively. The addition of small quantity of minor cannabinoids did not lead to a higher Cmax for CBD (282 ng/ml) but resulted in a much greater CBDA concentration of 1,011 ng/mL. The acidic forms of cannabinoids may become an important focus in the field and deserves further consideration to fully understand their functions and effectiveness.

We found that the serum concentrations were approximately 50% of what would be predicted to be the steady state for all cannabinoids except for THCA. This suggests differential metabolism of the cannabinoids which is in its infancy regarding companion animals. Though speculative, it appears that there may be some induction of the cytochrome p450 system leading to higher than expected biliary excretion after a week of twice daily dosing. This if further supported with the 24 hour pharmacokinetics showing a maximal serum concentration of 7-COOH-CBD at approximately 40 ng/mL in the serum which increased to over 150 ng/ml by one week into twice daily dosing suggesting an upregulation of hepatic metabolism.

In conclusion, this is the first comprehensive evaluation of hemp-derived cannabinoids from a specific product that is rich in both CBD and CBDA in cats. There appears to be superior absorption of the acidic forms of cannabinoids when compared to their decarboxylated counterparts. Our observation of superior absorption of the acids is also evident for CBD in this specific formulation when compared to the two other studies utilizing CBD in either a fish oil or medium chain triglyceride base. More importantly with this superior absorption we did not recognize any adverse events associated with a one week administration of the product, but results from one CBD-rich hemp product cannot be extrapolated to other products due to the strain differences in cannabinoid production.

TABLE 4

24-hour pharmacokinetic analysis of hemp derived cannabinoids (CBD, CBDA, THC, THCA, CBG and CBGA).

| | Dose (mg/kg) | Cmax (ng/ml) | Tmax (h) | T1/2 el (h) | AUC0-t | MRT (h) | Css Ave (ng/ml) |
|---|---|---|---|---|---|---|---|
| CBD | 1.37 ± 0.15 | 282.0 ± 149.4 | 2 ± 0 | 2.1 ± 1.1 | 908.5 ± 528.1 | 3.8 ± 1.0 | 102.1 ± 46.3 |
| CBDA | 1.13 ± 0.12 | 1011.3 ± 495.4 | 1.6 ± 1.1 | 2.7 ± 1.4 | 2638.7 ± 1284.8 | 3.3 ± 1.1 | 204.5 ± 87.8 |
| THC* | 0.05 ± 0.01 | 40.9 ± 12.9 | 2 ± 0 | 1.6 ± 0.4 | 156.5 ± 65.8 | 3.7 ± 0.4 | 11.9 ± 5.2 |
| THCA | 0.03 ± 0.003 | 87.9 ± 34.0 | 2 ± 0.9 | 3.8 ± 1.3 | 434.0 ± 229.1 | 5.5 ± 2.1 | 43.3 ± 13.9 |
| CBG** | 0.03 ± 0.003 | 4.35 ± 1.0 | 2 ± 0 | 0.9 ± 0.1 | 11.4 ± 2.8 | 2.3 ± 0.1 | 2.3 ± 0.5 |
| CBGA | 0.03 ± 0.003 | 19.7 ± 5.5 | 1 ± 0.2 | 0.7 ± 0.1 | 34.1 ± 9.5 | 1.5 ± 0.2 | 4.8 ± 1.3 |

*Represents 7 of 8 cats due to lack of time points having absorption above the lower level of detection to perform pharmacokinetic analysis.
**Represents 6 of 8 cats due to the lack of time points having adequate absorption above the lower level of detection to perform pharmacokinetic analysis.

TABLE 5

CBC and serum chemistry profile in cats before (pre) and one week (post) after oral administration of a CBD/CBDA rich hemp paste[1].

| Item | Reference range | Pre | Post (one week) | P value |
|---|---|---|---|---|
| Complete blood count | | | | |
| Hematocrit % | 31-48 | 39.6 ± 3.1 | 37.4 ± 3.0 | 0.07 |
| Hemoglobulin (g/dL) | 10.9-15.7 | 12.8 ± 0.9 | 11.7 ± 0.9 | <0.01 |
| RBC (mill/μL)[2] | 6.9-10.1 | 9.4 ± 1.0 | 8.6 ± 0.9 | <0.01 |
| WBC (thous/μL)[3] | 5.1-16.2 | 13.7 ± 2.7 | 11.4 ± 2.5 | 0.03 |
| Seg. Neut (thous/μL) | 2.3-10.7 | 5.3 ± 1.7 | 5.1 ± 1.9 | 0.02 |
| Lymphocytes (thous/μL) | 1.2-6.8 | 5.1 ± 1.9 | 4.8 ± 1.4 | 0.62 |
| Monocytes (thous/μL) | 0.1-0.4 | 0.3 ± 0.1 | 0.2 ± 0.1 | 0.02 |
| Eosinophils (thous/μL) | 0.1-2.2 | 1.4 ± 0.6 | 1.1 ± 0.4 | 0.04 |
| Basophils (thous/μL) | 0.1-0.1 | 0.1 ± 0.1 | 0 ± 0 | 0.03 |
| Platelet (thous/μL) | 195-624 | 255 ± 52 | 324 ± 128 | 0.11 |
| Serum Chemistry | | | | |
| Urea Nitrogen (mg/dL) | 17-35 | 28 ± 3 | 27 ± 4 | 0.40 |
| Creatinine (mg/dL) | 0.8-2.1 | 1.5 ± 0.3 | 1.5 ± 0.3 | 0.14 |
| Calcium (mg/dL) | 9.0-11.3 | 10.4 ± 0.9 | 10.2 ± 1.0 | 0.18 |
| Phosphorus (mg/dL) | 2.6-5.5 | 4.9 ± 0.3 | 4.7 ± 0.2 | 0.05 |
| Total Protein (g/dL) | 6.6-8.4 | 7.3 ± 0.5 | 7.0 ± 0.5 | <0.01 |
| Albumin (g/dL) | 3.2-4.3 | 3.8 ± 0.2 | 3.6 ± 0.2 | <0.01 |
| Globulin (g/dL) | 2.9-4.7 | 3.5 ± 0.4 | 3.3 ± 0.3 | 0.02 |
| Glucose (mg/dL) | 71-182 | 75 ± 10 | 74 ± 7 | 0.84 |
| ALT (U/L)[4] | 26-109 | 66 ± 11 | 84 ± 18 | <0.01 |
| AST (U/L)[5] | 17-48 | 26 ± 6 | 29 ± 5 | 0.18 |
| ALP (U/L)[6] | 11-49 | 35 ± 13 | 38 ± 16 | 0.44 |
| Cholesterol (mg/dL) | 101-223 | 157 ± 54 | 130 ± 43 | <0.01 |

[1]Values are mean ± standard deviation.
[2]Red blood cell.
[3]White blood cell.
[4]Alanine aminotransferase.
[5]Aspartate aminotransferase
[6]Alkaline phosphatase.

The invention claimed is:

1. A pharmaceutical composition comprising hemp extract, wherein the pharmaceutical composition is formulated in an orally deliverable paste for oral administration and wherein the paste comprises 1-10 mg of cannabidiol per g of paste, 1-10 mg of cannabidiolic acid per g of paste, 0.01-1 mg of cannabigerol per g of paste, and 0.01-1 mg of cannabigerolic acid per g of paste.

2. The pharmaceutical composition of claim 1, further comprising one or more of soy oil, dextrose, dried chicken liver, silica, inulin, polysorbate 60, potassium sorbate, sorbic acid, saccharin, mixed tocopherols, methylparaben, propylparaben, and combinations thereof.

3. The pharmaceutical composition of claim 1, further comprising:
α-pinene;
β-myrcene;
β-pinene;
δ-limonene;
linalool;
β-caryophyllene;
α-humulene;
nerolidol;
guaiol;
caryophyllene oxide; and
α-bisabolol.

4. The pharmaceutical composition of claim 3, comprising:
about 0.09-0.13% α-pinene;
about 0.23-0.44% β-myrcene;
about 0.04-0.09% β-pinene;
about 0.05-0.09% δ-limonene;
about 0.03-0.06% linalool;
about 0.04-0.07% β-caryophyllene;
about 0.02-0.04% α-humulene;
about 0.02-0.07% nerolidol;
about 0.02-0.04% guaiol;
about 0.04-0.08% caryophyllene oxide; and
about 0.01-0.04% α-bisabolol.

5. The pharmaceutical composition of claim 4, further comprising:
camphene;
β-ocimene;
eucalyptol; and/or
isopulegol.

6. The pharmaceutical composition of claim 5, comprising:
about 0.02% camphene;
about 0.02-0.03% β-ocimene;
about 0.02-0.05% eucalyptol;
about 0.02% isopulegol; and/or
about 0.02-0.04% nerolidol.

7. The pharmaceutical composition of claim 1, further comprising Δ9-tetrahydrocannabinol, wherein the concentration of Δ9-tetrahydrocannabinol is insufficient to produce a psychotropic effect.

8. The pharmaceutical composition of claim 1, further comprising Δ9-tetrahydrocannabinol, wherein the ratio of Δ9-tetrahydrocannabinol to the cannabidiol, cannabidiolic acid, cannabigerol, and cannabigerolic acid is about 1:25.

9. The pharmaceutical composition of claim 1, further comprising Δ9-tetrahydrocannabinol, wherein the concentration of Δ9-tetrahydrocannabinol is less than about 1 mg per g of paste.

10. The pharmaceutical composition of claim 1, wherein the pharmaceutical composition is formulated with a carrier.

11. The pharmaceutical composition of claim 10, wherein the carrier comprises one or more of: linseed oil, olive oil, fish oil, salmon oil, coconut oil, catnip oil, sesame oil, MCT oil, lecithin, carboxypolymethylene, grapeseed oil, and hemp seed oil.

12. The pharmaceutical composition of claim 10, wherein the carrier comprises lecithin.

13. The pharmaceutical composition of claim 12, wherein the lecithin is sunflower lecithin.

14. The pharmaceutical composition of claim 1, wherein the ratio of cannabidiol to cannabidiolic acid is from about 0.6:1 to about 1:0.6.

15. The pharmaceutical composition of claim 1, further comprising cannabichromene.

16. A method for alleviating or ameliorating pain in a veterinary subject in need thereof, comprising administering to the subject a therapeutically effective amount of the pharmaceutical composition of claim 1.

17. The method of claim 16, wherein the veterinary subject is a feline.

18. The method of claim 17, wherein the feline is a domestic cat.

\* \* \* \* \*